United States Patent [19]
Worrell

[11] Patent Number: 5,905,893
[45] Date of Patent: May 18, 1999

[54] MICROPROCESSOR ADAPTED FOR EXECUTING BOTH A NON-COMPRESSED FIXED LENGTH INSTRUCTION SET AND A COMPRESSED VARIABLE LENGTH INSTRUCTION SET

[75] Inventor: Frank Worrell, San Jose, Calif.

[73] Assignee: LSI Logic Corporation, Milpitas, Calif.

[21] Appl. No.: 08/659,708

[22] Filed: Jun. 10, 1996

[51] Int. Cl.$^6$ ..................................................... G06F 9/455
[52] U.S. Cl. .......................... 395/705; 395/386; 395/567; 395/800.43
[58] Field of Search ..................................... 394/704, 705, 394/386, 385, 567, 568, 800.43, 570

[56] References Cited

U.S. PATENT DOCUMENTS

| | | | |
|---|---|---|---|
| 4,274,138 | 6/1981 | Shimokawa | 395/385 |
| 4,437,149 | 3/1984 | Pomerene et al. | 395/389 |
| 4,839,797 | 6/1989 | Katori et al. | 395/386 |
| 4,897,787 | 1/1990 | Kawasaki et al. | 395/384 |
| 5,101,483 | 3/1992 | Tanagawa | 395/384 |
| 5,117,488 | 5/1992 | Noguchi et al. | 395/386 |
| 5,396,634 | 3/1995 | Zaidi et al. | 395/387 |
| 5,479,621 | 12/1995 | Duranton | 395/384 |
| 5,481,693 | 1/1996 | Blomgren et al. | 395/566 |
| 5,542,059 | 7/1996 | Blomgren | 395/800.41 |
| 5,542,060 | 7/1996 | Yoshida | 395/384 |
| 5,546,552 | 8/1996 | Coon et al. | 395/385 |
| 5,574,927 | 11/1996 | Scantlin | 395/800.41 |
| 5,577,259 | 11/1996 | Alferness et al. | 395/800.41 |
| 5,632,024 | 5/1997 | Yajima et al. | 395/381 |
| 5,652,852 | 7/1997 | Yokota | 395/384 |

FOREIGN PATENT DOCUMENTS

| | | |
|---|---|---|
| 2 284 492 | 6/1995 | United Kingdom . |
| 2 289 353 | 11/1995 | United Kingdom . |
| 2 290 395 | 12/1995 | United Kingdom . |

OTHER PUBLICATIONS

Ditzel et al., "The Hardware Architecture of the CRISP Microprocessor," 14$^{th}$ Annual International Symposium on Computer Architecture, Conference Proceedings (Cat. No. 87CH2420–8), Pittsburgh, PA, USA, Jun. 2–5, ISBN 0–8186–0776–9, 1987, Washington, DC, USA, IEEE Computer Society, Press, USA, pp. 309–319.

Patent Abstracts of Japan, Publication No. 07121352, Publication Date Dec. 5, 1995, Application Date Oct. 21, 1993, Application No. 05263304.

Primary Examiner—Kenneth S. Kim
Attorney, Agent, or Firm—Conley, Rose & Tayon, P.C.; B. Noel Kivlin

[57] ABSTRACT

A microprocessor is configured to fetch a compressed instruction set which comprises a subset of a corresponding non-compressed instruction set. The compressed instruction set is a variable length instruction set including 16-bit and 32-bit instructions. The 32-bit instructions are coded using an extend opcode, which indicates that the instruction being fetched is an extended (e.g. 32 bit) instruction. The compressed instruction set further includes multiple sets of register mappings from the compressed register fields to the decompressed register fields. Certain select instructions are assigned two opcode encodings, one for each of two mappings of the corresponding register fields. The compressed register field is directly copied into a portion of the decompressed register field while the remaining portion of the decompressed register field is created using a small number of logic gates. The subroutine call instruction within the compressed instruction set includes a compression mode which indicates whether or not the target routine is coded in compressed instructions. The compression mode is stored in the program counter register. The decompression of the immediate field used for load/store instructions having the global pointer register as a base register is optimized for mixed compressed/non-compressed instruction execution. The immediate field is decompressed into a decompressed immediate field for which the most significant bit is set.

18 Claims, 20 Drawing Sheets

| OPCODE | FUNC. | INSTRUCTION | OPERANDS |
|---|---|---|---|
| 11 | imm5 | LH | rt, rs |
| 13 | imm5 | LW | rt, xs |
| 15 | imm5 | LHU | rt, rs |
| 17 | imm5 | LW | rt, rs |
| 18 | imm5 | LB | rt, rs |
| 19 | imm5 | SH | rt, rs |
| 1a | imm5 | SB | rt, rs |
| 1b | imm5 | SW | rt, xs |
| 1c | imm5 | LBU | rt, rs |
| 1d | | special | |
| 1f | imm5 | SW | rt, rs |
| 12 | 02 | SLT | rs, rt |
| 12 | 06 | SLTU | rs, rt |
| 12 | 08 | MOVE | rs, xt |
| 12 | 0a | SLT | rs, xt |
| 12 | 0c | ADDU | rs, xt |
| 12 | 0e | SLTU | rs, xt |
| 12 | 10 | MOVE | xs, rt |
| 12 | 12 | SLT | xs, rt |
| 12 | 14 | ADDU | xs, rt |
| 12 | 16 | SLTU | xs, rt |
| 12 | 18 | MOVE | xs, xt |
| 12 | 1a | SLT | xs, xt |
| 12 | 1c | ADDU | xs, xt |
| 12 | 1e | SLTU | xs, xt |

FIG. 5A

| OPCODE | FUNC. | INSTRUCTION | OPERANDS |
| --- | --- | --- | --- |
| 10 | 02 | SRL | rt, imm3 |
| 10 | 03 | SRA | rt, imm3 |
| 10 | 04 | SLLV | rt, rs |
| 10 | 06 | SRLV | rt, rs |
| 10 | 07 | SRAV | rt, rs |
| 10 | 08 | JR | rs |
| 10 | 09 | JALR | xt, rs |
| 10 | 0c | SYSCALL | imm6 |
| 10 | 0d | BREAK | imm6 |
| 10 | 10 | ADD | rs, rt |
| 10 | 12 | SUB | rs, rt |
| 10 | 13 | NEG | rs, rt |
| 10 | 14 | AND | rs, rt |
| 10 | 15 | OR | rs, rt |
| 10 | 16 | XOR | rs, rt |
| 10 | 17 | NOT | rs, rt |

FIG. 5B

| OPCODE 106 | FUNC. 104 | INSTRUCTION 100 | OPERANDS 102 |
|---|---|---|---|
| 12 | 01 | ADDU | r0, rs, rt |
| 12 | 03 | SUBU | r0, rs, rt |
| 12 | 05 | ADDU | r1, rs, rt |
| 12 | 07 | SUBU | r1, rs, rt |
| 12 | 09 | ADDU | r2, rs, rt |
| 12 | 0b | SUBU | r2, rs, rt |
| 12 | 0d | ADDU | r3, rs, rt |
| 12 | 0f | SUBU | r3, rs, rt |
| 12 | 11 | ADDU | r4, rs, rt |
| 12 | 13 | SUBU | r4, rs, rt |
| 12 | 15 | ADDU | r5, rs, rt |
| 12 | 17 | SUBU | r5, rs, rt |
| 12 | 19 | ADDU | r6, rs, rt |
| 12 | 1b | SUBU | r6, rs, rt |
| 12 | 1d | ADDU | r7, rs, rt |
| 12 | 1f | SUBU | r7, rs, rt |
| 16 | imm | SLL | rd, rt, imm |

| OPCODE | INSTRUCTION | OPERANDS |
|---|---|---|
| 00 | BEQZ | xs, simm8 |
| 01 | BNEZ | xs, simm8 |
| 04 | BEQZ | rs, simm8 |
| 05 | BNEZ | rs, simm8 |
| 08 | MOVEI | rs, imm8 |
| 09 | ADDIU | rs, simm8 |
| 0a | SLTI | rs, imm8 |
| 0b | SLTIU | rs, imm8 |
| 0c | ANDI | rs, imm8 |
| 0e | CMPI | rs, imm8 |

FIG. 5D

| OPCODE | INSTRUCTION | OPERANDS |
|---|---|---|
| 02 | BR | simm11 |
| 0f | extend | imm11 |

FIG. 5E

| OPCODE | INSTRUCTION | OPERANDS |
| --- | --- | --- |
| 04 | BEQ | rs, rt, simm12 |
| 05 | BNE | rs, rt, simm12 |
| 06 | BLEZ | rs, simm12 |
| 07 | BGTZ | rs, simm12 |
| 08 | ADDI | rt, rs, simm12 |
| 09 | ADDIU | rt, rs, simm12 |
| 0a | SLTI | rt, rs, simm12 |
| 0b | SLTIU | rt, rs, simm12 |
| 0c | ANDI | rt, rs, simm12 |
| 0d | ORI | rt, rs, simm12 |
| 0e | XORI | rt, rs, simm12 |
| 0f | LUI | rt, simm12 |
| 10 | LB | rt, rs, simm12 |
| 11 | LH | rt, rs, simm12 |
| 12 | LWL | rt, rs, simm12 |
| 13 | LW | rt, rs, simm12 |
| 14 | LBU | rt, rs, simm12 |
| 15 | LHU | rt, rs, simm12 |
| 16 | LWR | rt, rs, simm12 |
| 18 | SB | rt, rs, simm12 |
| 19 | SH | rt, rs, simm12 |
| 1a | SWL | rt, rs, simm12 |
| 1b | SW | rt, rs, simm12 |
| 1e | SWR | rt, rs, simm12 |

FIG. 6A

| RT | INSTRUCTION | OPERANDS |
|---|---|---|
| 00 | BLTZ | rs, simm12 |
| 01 | BGEZ | rs, simm12 |
| 02 | BLTZL | rs, simm12 |
| 03 | BGEZL | rs, simm12 |
| 08 | TGEI | rs, simm12 |
| 09 | TGEIU | rs, simm12 |
| 0a | TLTI | rs, simm12 |
| 0b | TLTIU | rs, simm12 |
| 0c | TEQI | rs, simm12 |
| 0e | TNEI | rs, simm12 |
| 10 | BLTZAL | rs, simm12 |
| 11 | BGEZAL | rs, simm12 |
| 12 | BLTZALL | rs, simm12 |
| 13 | BGEZALL | rs, simm12 |

| FUNC. | INSTRUCTION | OPERANDS |
|---|---|---|
| 00 | SLL | rd, rt, imm5 |
| 02 | SRL | rd, rt, imm5 |
| 03 | SRA | rd, rt, imm5 |
| 04 | SLLV | rd, rt, rs |
| 06 | SRLV | rd, rt, rs |
| 07 | SRAV | rd, rt, rs |
| 08 | JR | rs |
| 09 | JALR | rd, rs |
| 0c | SYSCALL | imm15 |
| 0d | BREAK | imm15 |
| 0f | SYNC | |
| 10 | MFHI | rd |
| 11 | MTHI | rs |
| 12 | MFLO | rd |
| 13 | MTLO | rs |
| 18 | MULT | rs, rt |
| 19 | MULTU | rs, rt |
| 1a | DIV | rs, rt |
| 1b | DIVU | rs, rt |

FIG. 6C

| FUNC. | INSTRUCTION | OPERANDS |
|---|---|---|
| 20 | ADD | rd, rs, rt |
| 21 | ADDU | rd, rs, rt |
| 22 | SUB | rd, rs, rt |
| 23 | SUBU | rd, rs, rt |
| 24 | AND | rd, rs, rt |
| 25 | OR | rd, rs, rt |
| 26 | XOR | rd, rs, rt |
| 27 | NOR | rd, rs, rt |
| 2a | SLT | rd, rs, rt |
| 2b | SLTU | rd, rs, rt |
| 30 | TGE | rs, rt |
| 31 | TGEU | rs, rt |
| 32 | TLT | rs, rt |
| 33 | TLTU | rs, rt |
| 34 | TEQ | rs, rt |
| 36 | TNE | rs, rt |

FIG. 6D

MICROPROCESSOR ADAPTED FOR EXECUTING BOTH A NON-COMPRESSED FIXED LENGTH INSTRUCTION SET AND A COMPRESSED VARIABLE LENGTH INSTRUCTION SET

BACKGROUND OF THE INVENTION

1. Field of the Invention

This invention relates to the field of microprocessors and, more particularly, to optimization of the instruction set of a microprocessor.

2. Description of the Relevant Art

Microprocessor architectures may generally be classified as either complex instruction set computing (CISC) architectures or reduced instruction set computing (RISC) architectures. CISC architectures specify an instruction set comprising high level, relatively complex instructions. Often, microprocessors implementing CISC architectures decompose the complex instructions into multiple simpler operations which may be more readily implemented in hardware. Microcoded routines stored in an on-chip read-only memory (ROM) have been successfully employed for providing the decomposed operations corresponding to an instruction. More recently, hardware decoders which separate the complex instructions into simpler operations have been adopted by certain CISC microprocessor designers. The x86 microprocessor architecture is an example of a CISC architecture.

Conversely, RISC architectures specify an instruction set comprising low level, relatively simple instructions. Typically, each instruction within the instruction set is directly implemented in hardware. Complexities associated with the CISC approach are removed, allowing for more advanced implementations to be designed. Additionally, high frequency designs may be achieved more easily since the hardware employed to execute the instructions is simpler. An exemplary RISC architecture is the MIPS RISC architecture.

Although not necessarily a defining feature, variable-length instruction sets have often been associated with CISC architectures while fixed-length instruction sets have been associated with RISC architectures. Variable-length instruction sets use dissimilar numbers of bits to encode the various instructions within the set as well as to specify addressing modes for the instructions, etc. Generally speaking, variable-length instruction sets attempt to pack instruction information as efficiently as possible into the byte or bytes representing each instruction. Conversely, fixed-length instruction sets employ the same number of bits for each instruction (the number of bits is typically a multiple of eight such that each instruction fully occupies a fixed number of bytes). Typically, a small number of instruction formats comprising fixed fields of information are defined. Decoding each instruction is thereby simplified to routing bits corresponding to each fixed field to logic designed to decode that field.

Because each instruction in a fixed-length instruction set comprises a fixed number of bytes, locating instructions is simplified as well. The location of numerous instructions subsequent to a particular instruction is implied by the location of the particular instruction (i.e. as fixed offsets from the location of the particular instruction). Conversely, locating a second variable-length instruction requires locating the end of the first variable-length instruction; locating a third variable-length instruction requires locating the end of the second variable-length instruction, etc. Still further, variable-length instructions lack the fixed field structure of fixed-length instructions. Decoding is further complicated by the lack of fixed fields.

Unfortunately, RISC architectures employing fixed-length instruction sets suffer from problems not generally applicable to CISC architectures employing variable-length instruction sets. Because each instruction is fixed length, certain of the simplest instructions may effectively waste memory by occupying bytes which do not convey information concerning the instruction. For example, fields which are specified as "don't care" fields for a particular instruction or instructions in many fixed-length instruction sets waste memory. In contrast, variable-length instruction sets pack the instruction information into a minimal number of bytes.

Still further, since RISC architectures do not include the more complex instructions employed by CISC architectures, the number of instructions employed in a program coded with RISC instructions may be larger than the number of instructions employed in the same program coded in with CISC instructions. Each of the more complex instructions coded in the CISC version of the program is replaced by multiple instructions in the RISC version of the program. Therefore, the CISC version of a program often occupies significantly less memory than the RISC version of the program. Correspondingly, more bandwidth between devices storing the program, memory, and the microprocessor is needed for the RISC version of the program than for the CISC version of the program.

SUMMARY OF THE INVENTION

The problems outlined above are in large part solved by a microprocessor in accordance with the present invention. The microprocessor is configured to fetch a compressed instruction set which comprises a subset of a corresponding non-compressed instruction set. The non-compressed instruction set may be a RISC instruction set, such that the microprocessor may enjoy the high frequency operation and simpler execution resources typically associated with RISC architectures. Fetching the compressed instructions from memory and decompressing them within the microprocessor advantageously decreases the memory bandwidth required to achieve a given level of performance (e.g. instructions executed per second). Still further, the amount of memory occupied by the compressed instructions may be comparatively less than the corresponding non-compressed instructions may occupy.

The exemplary compressed instruction set described herein is a variable length instruction set. According to one embodiment, two distinct instruction lengths are included: 16-bit and 32-bit instructions. The 32-bit instructions are coded using an extend opcode, which indicates that the instruction being fetched is an extended (e.g. 32 bit) instruction. Instructions may be fetched as 16-bit quantities. When a 16-bit instruction having the extend opcode is fetched, the succeeding 16-bit instruction is concatenated with the instruction having the extend opcode to form a 32-bit extended instruction. Extended instructions have enhanced capabilities with respect to non-extended instructions, further enhancing the flexibility and power of the compressed instruction set. Routines which employ the capabilities included in the extended instructions may thereby be coded using compressed instructions.

The compressed instruction set further includes multiple sets of register mappings from the compressed register fields to the decompressed register fields. Each value coded in the compressed register fields decompresses to a different register within the microprocessor. In one embodiment, the compressed register fields comprise three bits each. Therefore, eight registers are accessible to a particular instruction. In order to offer access to additional registers for certain select instructions, the select instructions are assigned two opcode encodings. One of the opcode encodings indicates a first mapping of register fields, while the second opcode encoding indicates a second mapping of register fields. Advantageously, the compressed register fields may include relatively few bits while select instructions for which access to additional registers is desired may be granted such access. Additionally, the register mappings are selected to minimize the logic employed to decompress register fields. In one embodiment, the compressed register field is directly copied into a portion of the decompressed register field while the remaining portion of the decompressed register field is created using a small number of logic gates.

The microprocessor supports programs having routines coded in compressed instructions and other routines coded in non-compressed instructions. The subroutine call instruction within the compressed instruction set includes a compression mode which indicates whether or not the target routine is coded in compressed instructions. The compression mode specified by the subroutine call instruction is captured by the microprocessor as the compression mode for the routine. In one embodiment, the compression mode is stored as one of the fetch address bits (stored in a program counter register within the microprocessor). Since the compression mode is part of the fetch address and the subroutine call instruction includes storing a return address for the subroutine, the compression mode of the calling routine is automatically stored upon execution of a subroutine call instruction. When a subroutine return instruction is executed, the compression mode of the calling routine is thereby automatically restored.

An additional feature of one embodiment of the microprocessor is the decompression of the immediate field used for load/store instructions having the global pointer register as a base register. The immediate field is decompressed into a decompressed immediate field for which the most significant bit is set. A subrange of addresses at the lower boundary of the global variable address space is thereby allocated for global variables of compressed instructions. Non-compressed instructions may store global variables in the remainder of the global variable address space. Advantageously, global variable allocation between the compressed and non-compressed routines of a particular program may be relatively simple since the subranges are separate.

Broadly speaking, the present invention contemplates a microprocessor comprising an instruction decompressor and a processor core. The instruction decompressor is coupled to receive compressed instructions which are members of a variable-length compressed instruction set. The instruction decompressor is configured to decompress each received compressed instruction into a corresponding decompressed instruction. Coupled to receive decompressed instructions, the processor core is configured to execute the decompressed instructions.

The present invention further contemplates a method for executing instruction code. Compressed instructions are fetched, wherein the compressed instructions are members of a variable-length compressed instruction set. The compressed instructions are decompressed in an instruction decompressor, thereby forming corresponding decompressed instructions. The decompressed instructions are executed in a processor core.

The present invention still further contemplates an apparatus for executing instruction code, comprising a fetching means, a decompressing means, and an executing means. The fetching means fetches compressed instructions which are members of a variable-length compressed instruction set. The decompressing means decompresses the compressed instructions, thereby forming corresponding decompressed instructions. The executing means executes the decompressed instructions.

BRIEF DESCRIPTION OF THE DRAWINGS

Other objects and advantages of the invention will become apparent upon reading the following detailed description and upon reference to the accompanying drawings in which:

FIGS. 5A, 5B, 5C, 5D, and 5E are tables of exemplary instructions using the formats shown in FIGS. 3A, 3B, 3C, and 3D.

FIGS. 6A, 6B, 6C, 6D, 6E, and 6F are tables of exemplary instructions using the formats shown in FIGS. 4A, 4B, 4C, and 4D.

Figure 1:
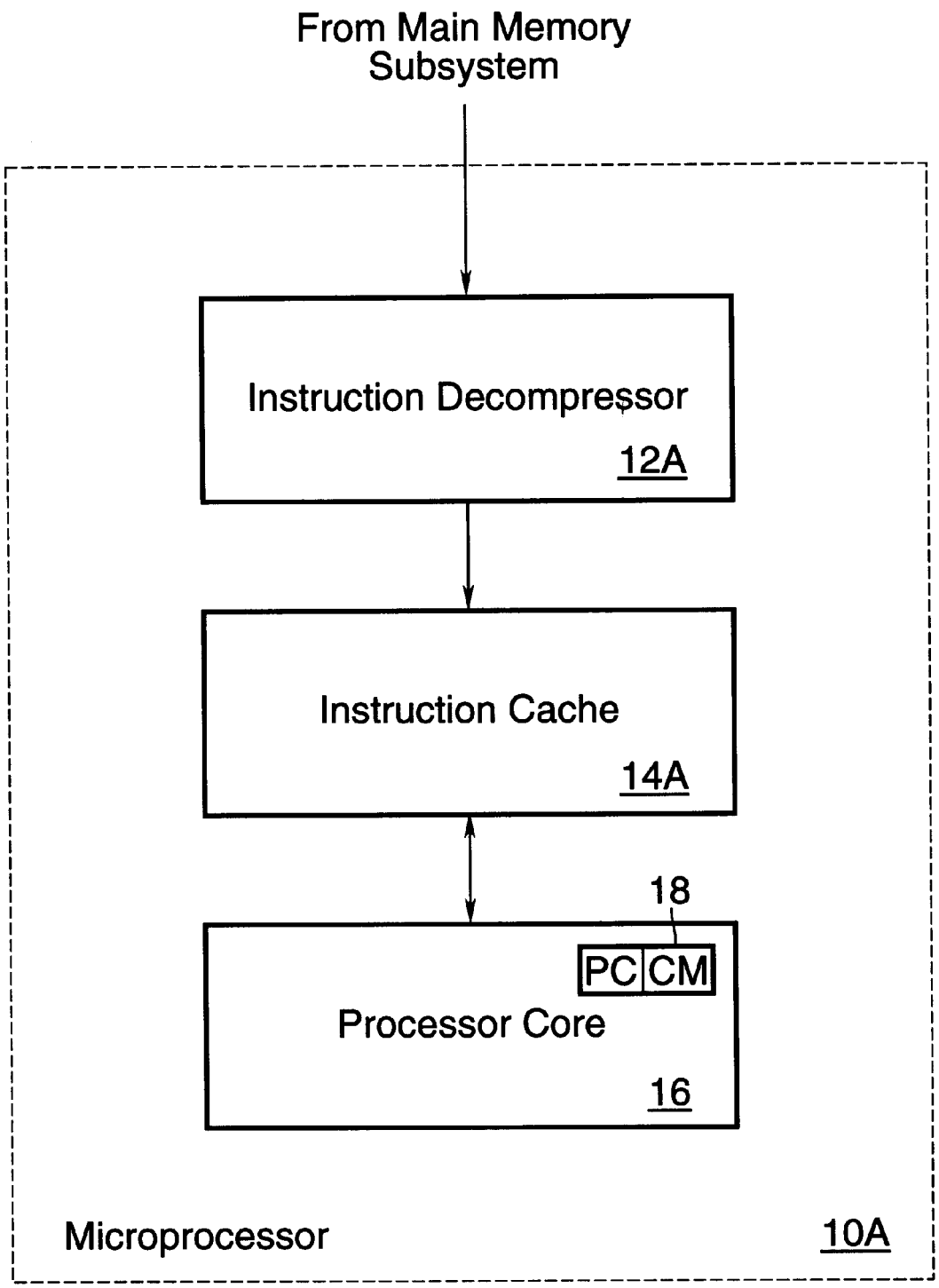
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of a first embodiment of a microprocessor 10A is shown. Microprocessor 10A includes an instruction decompressor 12A, an instruction cache 14A, and a processor core 16. Instruction decompressor 12A is coupled to receive instruction bytes from a main memory subsystem (not shown). Instruction decompressor 12A is further coupled to instruction cache 14A. Instruction cache 14A is coupled to processor core 16.

Generally speaking, microprocessor 10A is configured to fetch compressed instructions from the main memory subsystem. The compressed instructions are passed through instruction decompressor 12A, which expands the compressed instructions into decompressed instructions for storage within instruction cache 14A. Many of the compressed instructions occupy fewer memory storage locations than the corresponding decompressed instructions, advantageously reducing the amount of memory required to store a particular program. Additionally, since instructions are decompressed within microprocessor 10A, the bandwidth required to transport the compressed instructions from the main memory subsystem to microprocessor 10A is reduced. Microprocessor 10A may be employed within a computer system having a relatively small main memory. Relatively large programs may be stored in the main memory due to the compression of instructions stored therein.

In one embodiment, microprocessor 10A is configured to execute both compressed and non-compressed instructions on a routine-by-routine basis. In other words, a routine may be coded using either compressed instructions or non-compressed instructions. Advantageously, routines which may not be efficiently coded in the compressed instruction set may be coded using non-compressed instructions, while routines which are efficiently coded in the compressed instruction set are so coded. Microprocessor 10A may support a particular decompression of the immediate field for load/store instructions using the global pointer register as a base register, in order to support mixing of compressed and non-compressed instructions. The particular decompression is detailed further below. Additionally, a compression mode is detected by instruction decompressor 12A. The compression mode identifies the instruction set in which a routine is coded: compressed or non-compressed.

Instruction compression is achieved in microprocessor 10A by imposing certain limitations upon the available instruction encodings. By limiting the instruction encodings, instruction field sizes may be reduced (i.e. the number of bits within an instruction field may be decreased). For example, the number of available registers may be reduced to form the compressed instruction set. Because fewer registers are available, a smaller field may be used to encode the registers used as source and destination operands for the instruction. Instruction decompressor 12A expands the encoded register field into a decompressed register field. The decompressed register field is included in the decompressed instruction. The compressed instructions use the reduced instruction fields, thereby occupying less memory (i.e. fewer bits) than the original instruction encodings defined by the microprocessor architecture employed by processor core 16.

Instruction decompressor 12A is configured to accept compressed instructions and to decompress the instructions into the original instruction encodings. Each instruction field within a particular compressed instruction is expanded from the compressed field to a corresponding decompressed field within the corresponding decompressed instruction. The decompressed instruction is coded in the original instruction format supported by processor core 16.

Processor core 16 includes circuitry for fetching instructions from instruction cache 14A, decoding the instructions, and executing the instructions. The instructions supported by processor core 16 are specified by the microprocessor architecture employed therein. In one particular embodiment, processor core 16 employs the MIPS RISC architecture. However, it is understood that processor core 16 may employ any microprocessor architecture. Since instruction decompressor 12A decompresses instructions into the original instruction format, processor core 16 may comprise a previously designed processing core. In other words, the processing core may not require substantial modification to be included within microprocessor 10A.

The MIPS RISC architecture specifies an instruction set comprising 32 bit fixed-length instructions. A compressed instruction set is defined for microprocessor 10A which comprises variable-length instructions. Many of the compressed instructions comprise 16-bit instructions. Other compressed instructions comprised 32 bit instructions in conjunction with the extend instruction described below. Several 16-bit and 32-bit instruction formats are defined. It is understood that, although 16-bit and 32-bit compressed instructions are used in this embodiment, other embodiments may employ different instruction lengths. The compressed instructions encode a subset of the non-compressed instructions. Instruction encodings supported within the compressed instruction set comprise many of the most commonly coded instructions as well as the most often used registers, such that many programs, or routines within the programs, may be coded using the compressed instructions.

In one embodiment, microprocessor 10A employs a compression mode. If the compression mode is active, then compressed instructions are being fetched and executed. Instruction decompressor 12A decompresses the instructions when they are transferred from main memory to instruction cache 14. Alternatively, the compressed mode may be inactive. When the compression mode is inactive, non-compressed instructions are being fetched and executed. Instruction decompressor 12A is bypassed when the compressed mode is inactive. In one particular embodiment, the compression mode is indicated by a bit within the fetch address (e.g. bit 0). The current fetch address may be stored in a PC register 18 within processor core 16. Bit 0 of PC register 18 indicates the compression mode (CM) of microprocessor 10A.

Instruction cache 14A is a high speed cache memory configured to store decompressed and non-compressed instructions. Although any cache organization may be employed by instruction cache 14A, a set associative or direct mapped configuration may be suitable for the embodiment shown in FIG. 1.

Figure 2:
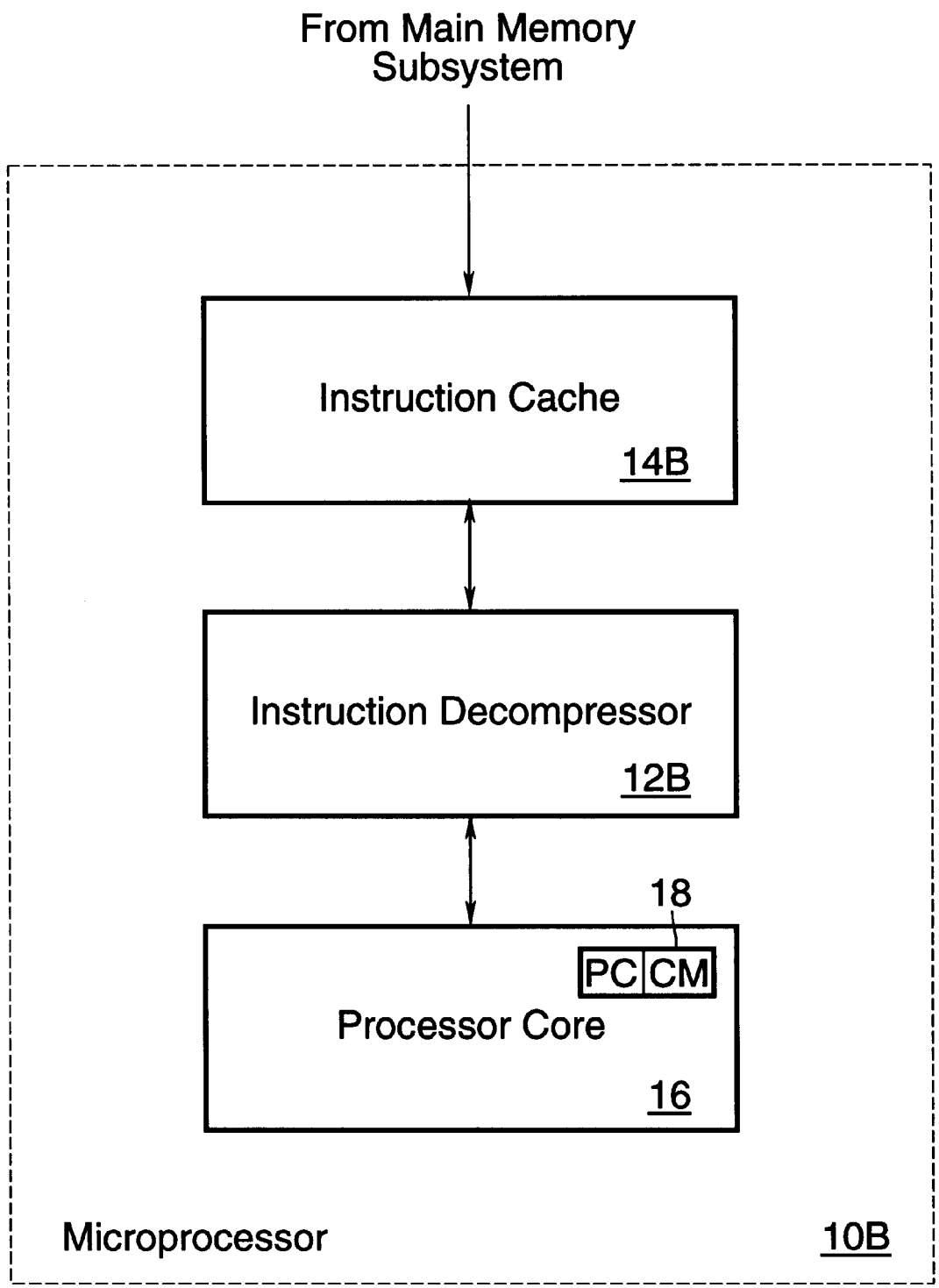
FIG. 2 is a block diagram of a second embodiment of a microprocessor.

Turning next to FIG. 2, a second embodiment of a microprocessor 10B is shown. Microprocessor 10B includes an instruction cache 14B coupled to receive instruction bytes from the main memory subsystem, an instruction decompressor 12B, and processor core 16. Instruction cache 14B is coupled to instruction decompressor 12B, which is further coupled to processor core 16.

Microprocessor 10B is configured with instruction decompressor 12B between instruction cache 14B and processor core 16. Instruction cache 14B stores the compressed instructions transferred from the main memory subsystem. In this manner, instruction cache 14B may store a relatively larger number of instructions than a similarly sized instruction cache employed as instruction cache 14A in microprocessor 10A. Instruction decompressor 12B receives fetch addresses corresponding to instruction fetch requests from processor core 16, and accesses instruction cache 14B in response to the fetch request. The corresponding compressed instructions are decompressed into decompressed instructions by instruction decompressor 12B. The decompressed instructions are transmitted to processor core 16.

Similar to microprocessor 10A, microprocessor 10B includes a compression mode in one embodiment. Instruction decompressor 12B is bypassed when non-compressed instructions are being fetched and executed. For this embodiment, instruction cache 14B stores both compressed and non-compressed instructions. It is noted that instruction cache 14B typically stores instruction bytes in fixed-size storage locations referred to as cache lines. Therefore, a particular cache line may be storing compressed or non-compressed instructions. In either case, a plurality of instruction bytes are stored. Therefore, instruction caches 14A and 14B may be of similar construction. The compression mode at the time a cache line is accessed determines whether the instruction bytes are interpreted as compressed or non-compressed instructions.

An alternative configuration for microprocessor 10B is to include instruction decompressor 12B within the instruction decode logic of processor core 16. The compressed instructions may not actually be decompressed in such an embodiment. Instead, the compressed instructions may be decoded directly by the decode logic. The decoded instructions may be similar to the decoded instructions generated for the non-compressed instructions which correspond to the compressed instructions.

It is noted that microprocessors 10A and 10B are merely exemplary embodiments of a microprocessor 10 which operates upon compressed instructions. For the remainder of this discussion, microprocessor 10, instruction cache 14, and instruction decompressor 12 will be used to refer to the corresponding elements of both FIGS. 1 and 2 as well as other embodiments of the elements included in other implementations of microprocessor 10.

The terms decompression, compressed instruction, decompressed instruction, and non-compressed instruction are used in the above discussion and may further be used below. As used herein, the term "compressed instruction" refers to an instruction which is stored in a compressed form in memory. The compressed instruction is generally stored using fewer bits than the number of bits used to store the instruction when represented as defined in the microprocessor architecture employed by processor core 16. The term "decompressed instruction" refers to the result of expanding a compressed instruction into the original encoding as defined in the microprocessor architecture employed by processor core 16. The term "non-compressed instruction" refers to an instruction represented in the encoding defined by the microprocessor architecture employed by processor core 16. Non-compressed instructions are also stored in memory in the same format (i.e. non-compressed instructions were never compressed). Finally, the term "decompression" refers to the process of expanding a compressed instruction into the corresponding decompressed instruction.

It is noted that instruction decompressors 12A and 12B may be configured to simultaneously decompress multiple compressed instructions. Such embodiments of instruction decompressors 12 may be employed with embodiments of processor core 16 which execute multiple instructions per clock cycle.

FIGS. 3A–3D and 4A–4D depict exemplary instruction formats for 16-bit and 32-bit compressed instructions, respectively, according to one specific embodiment of microprocessor 10 employing the MIPS RISC architecture. Other instructions formats may be employed by other embodiments. The instruction formats shown in FIGS. 3A–3D each comprise 16 bits in this particular implementation. Conversely, the instruction formats shown in FIGS. 4A–4D each comprise 32 bits in this particular implementation. The compressed instructions encoded using the instruction formats are decompressed into instruction formats as defined by the MIPS RISC architecture for each instruction.

Figure 3A:
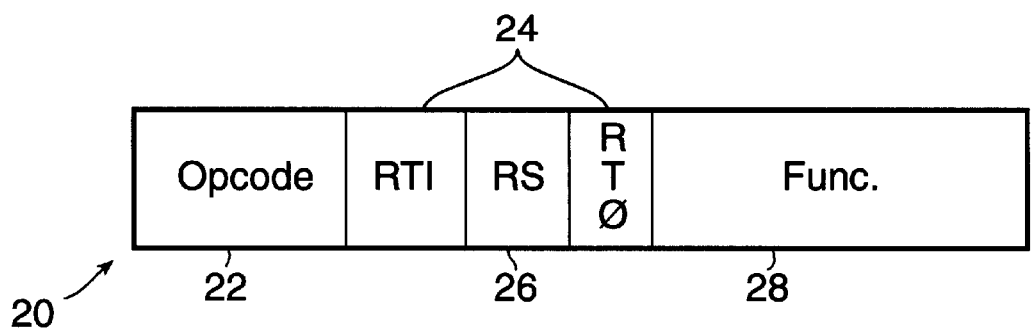
FIG. 3A is a first instruction format supported by one embodiment of the microprocessors shown in FIGS. 1 and 2.

FIG. 3A depicts a first instruction format 20. Instruction format 20 includes an opcode field 22, a first register field 24, a second register field 26, and a function field 28. Opcode field 22 is used to identify the instruction. Additionally, function field 28 is used in conjunction with certain particular encodings of opcode field 22 to identify the instruction. Effectively, function field 28 and opcode field 22 together form the opcode field for these instructions. When opcode field 22 employs certain other encodings than the particular encodings, function field 28 is used as an immediate field.

First register field 24 and second register field 26 identify destination and source registers for the instruction. The destination register is also typically used as a source register for the instruction. In this manner, two source operands and one destination operand are specified via first register field 24 and second register field 26. The notations "RT" and "RS" in first register field 24 and second register field 26 indicate the use of the fields in the instruction tables below. Either RT or RS may be a destination register, depending upon the encoding of the instruction.

In one embodiment, opcode field 22 comprises 5 bits, first register field 24 and second register field 26 comprise 3 bits each, and function field 28 comprises 5 bits. First register field 24 is divided into two subfields (labeled RT1 and RT0). RT1 comprises two bits in the present embodiment, while RT0 comprises one bit. RT1 is concatenated with RT0 to form first register field 24. Subfield RT1 and second register field 26 are used in certain instructions encoded via instruction format 20 to indicate one of the 32 registers defined by the MIPS RISC architecture.

Figure 3B:
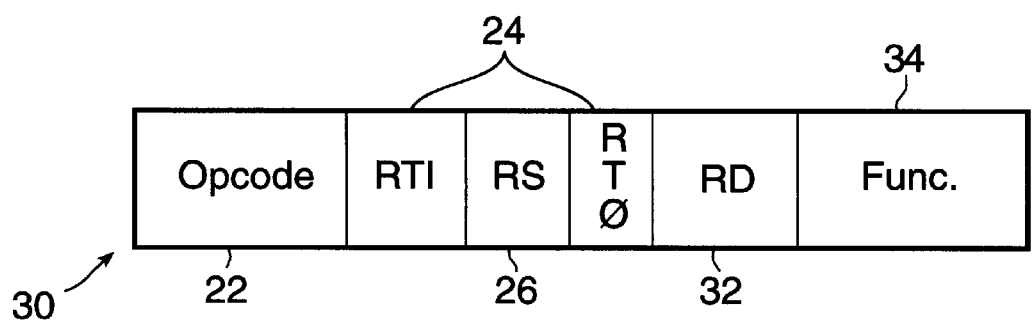
FIG. 3B is a second instruction format supported by one embodiment of the microprocessors shown in FIGS. 1 and 2.

FIG. 3B depicts a second instruction format 30. Instruction format 30 includes opcode field 22, first register field 24, and second register field 26. Additionally, a third register field 32 and a function field 34 are shown. Third register field 32 is generally used to identify the destination register for instructions using instruction format 30. Therefore, first register field 24 and second register field 26 comprise source registers for instruction format 30. Function field 34 is used similar to function field 28. In the embodiment shown, third register field 32 comprises three bits and function field 34 comprises two bits.

Figure 3C:
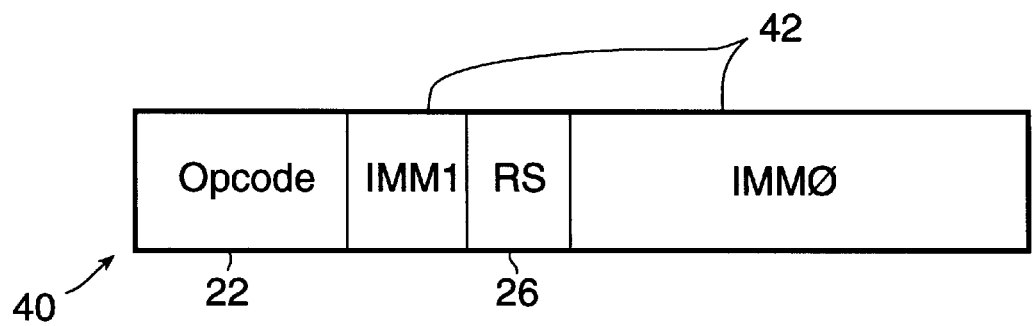
FIG. 3C is a third instruction format supported by one embodiment of the microprocessors shown in FIGS. 1 and 2.

A third instruction format 40 is shown in FIG. 3C. Instruction format 40 includes opcode field 22 and second register field 26, as well as an immediate field 42. Immediate field 42 is used to provide immediate data for the instruction specified by instruction format 40. Immediate data is an operand of the instruction, similar to the value stored in a register specified by first register field 24 or second register field 26. For example, an add instruction which uses immediate data adds the immediate data to the value stored in the destination register, and stores the resulting sum into that destination register. In one embodiment, immediate field 42 comprises eight bits. Immediate field 42 is divided into two subfields (IMM1 and IMM0) in the instruction format shown in FIG. 3C. The subfields allow second register field 26 to be placed in the same bit positions within instruction format 40 as it is placed in instruction formats 20 and 30. Advantageously, second register field 26 is always found in the same position of 16-bit instructions in which it is used. Therefore, subfield IMM1 comprises 2 bits and subfield IMM0 comprises 6 bits. IMM1 is concatenated with IMM0 to form the immediate value.

Figure 3D:
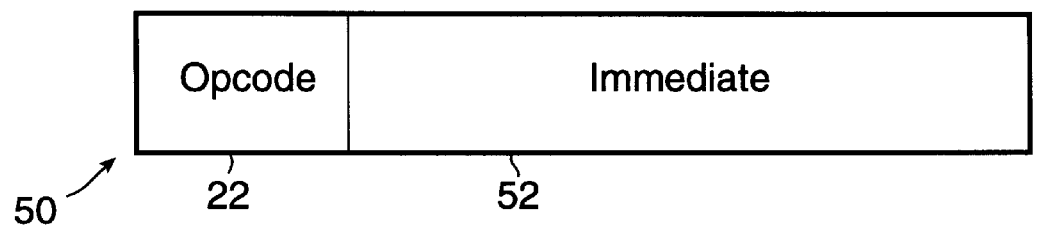
FIG. 3D is a fourth instruction format supported by one embodiment of the microprocessors shown in FIGS. 1 and 2.

FIG. 3D depicts a fourth instruction format 50. Instruction format 50 includes opcode field 22 and an immediate field 52. Immediate field 52, similar to immediate field 42, is used as an operand of the instruction. However, immediate field 52 comprises 11 bits.

Figure 4A:
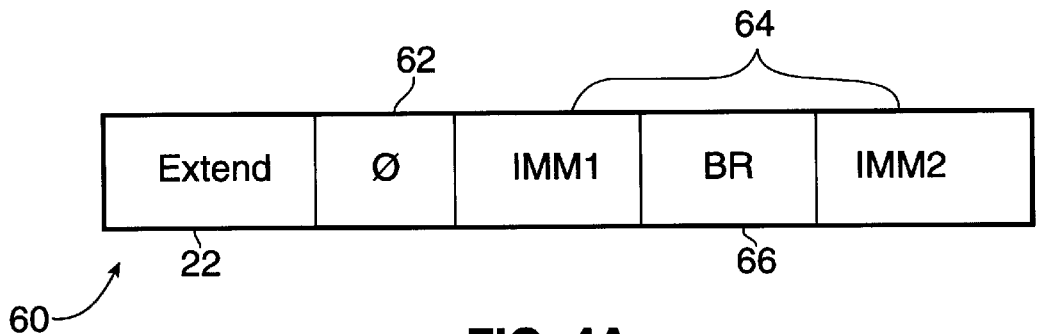
FIG. 4A is a fifth instruction format supported by one embodiment of the microprocessors shown in FIGS. 1 and 2.

FIG. 4A depicts a fifth instruction format 60. Instruction format 60 includes opcode field 22, which is coded as the extend instruction. Instruction decompressor 12 recognizes the extend instruction opcode within opcode field 22 and treats the current instruction as a 32-bit instruction (i.e. the 16 bits included in the instruction containing the extend opcode and the 16 bits which would otherwise comprise the next instruction in program order are concatenated to form a 32 bit instruction). Therefore, the compressed instruction can be seen to be a variable-length instruction set comprising 16-bit instructions and 32-bit instructions. Instruction format 60 further includes a zero field 62 comprising six bits (coded to all binary zeros), an immediate field 64, and a BR field 66. Instruction format 60 is used to code an extended form of the BR instruction (an unconditional branch instruction), and hence BR field 66 is an opcode field indicating the BR instruction. In one embodiment, the BR opcode is hexadecimal 02.

The extended BR instruction has a larger immediate field than the non-extended BR instruction, and therefore may be coded with larger offsets than the non-extended BR instruction. When a branch to an instruction distant from the branch instruction is desired, the extended BR instruction may be used. Alternatively, branches to close instructions may use the non-extended BR instruction. Immediate field 64 comprises 16 bits which are used as an offset to be added to the address of the instruction following the BR instruction to create the target address of the branch instruction. The non-extended BR instruction, by contrast, includes an eleven bit offset (i.e. it is coded using instruction format 50).

Figure 4B:
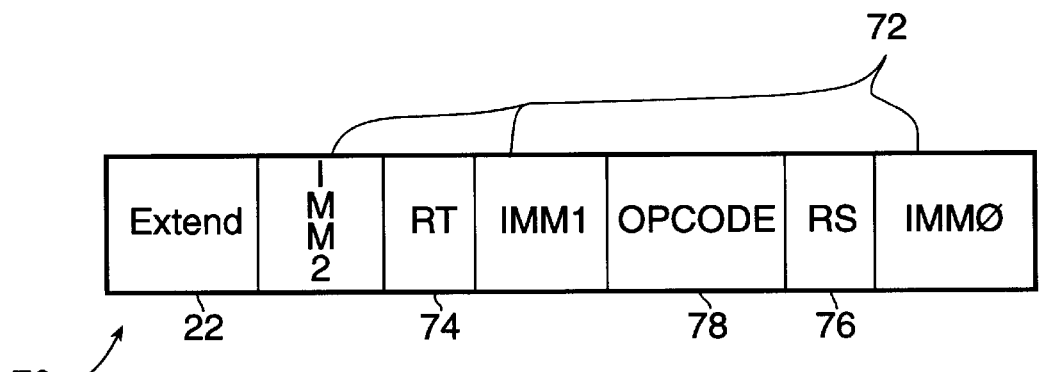
FIG. 4B is a sixth instruction format supported by one embodiment of the microprocessors shown in FIGS. 1 and 2.

FIG. 4B depicts an instruction format 70 which is an extended version of instruction format 40. Instruction format 70 includes opcode field 22 coded as the extend opcode, as well as an immediate field 72, a first register field 74, a second register field 76, and a second opcode field 78. First register field 74 and second register field 76 comprise five bits each in the embodiment shown. Therefore, any register defined by the MIPS RISC architecture may be accessed using instruction format 70. Second opcode field 78 defines the instruction being executed, and comprises 5 bits (similar to opcode field 22). Finally, immediate field 72 comprises 12 bits divided into a one bit IMM2 subfield, a five bit IMM1 subfield, and a six bit IMM0 subfield. Immediate field 72 is formed by concatenating IMM2 with IMM1 and further with IMM0 in the embodiment shown.

Figure 4C:
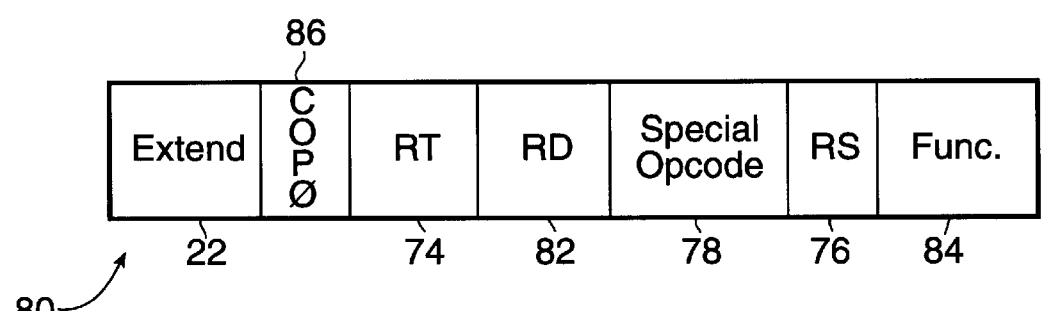
FIG. 4C is a seventh instruction format supported by one embodiment of the microprocessors shown in FIGS. 1 and 2.

An extended instruction format corresponding to instruction format 30 is shown in FIG. 4C as an instruction format 80. Instruction format 80 includes opcode field first register field 74, second register field 76, and second opcode field 78, similar to instruction format 70. Additionally, instruction format 80 includes a third register field 82 and a function field 84. Third register field 82 is similar to third register field 32, except that third register field 82 comprises five bits. Therefore, any MIPS RISC architecture register may be specified by third register field 82. Function field 84 is similar to function fields 28 and 34, except that function field 84 comprises six bits.

Second opcode field 78 is coded to a particular value to identify instruction format 80 from instruction format 70. When second opcode field 78 is coded to the particular value, instruction format 80 is assumed by instruction decompressor 12. Conversely, when second opcode field 78 is coded to a value other than the particular value, instruction format 70 is assumed by instruction decompressor 12. In one embodiment, the particular value comprises hexadecimal 00.

Instruction format 80 further includes a COP0 bit 86. COP0 bit 86, when set, indicates that certain coprocessor zero instructions (as defined in the MIPS RISC architecture) are being executed. The tables of instructions below further define the instructions encoded by setting COP0 bit 86.

The instructions defined for instruction formats 20, 30, 40, and 50 are capable of performing many of the operations commonly performed in typical programs. However, routines may need to perform operations of which these instructions are incapable. While most of the instructions in the routine may be coded using instruction formats 20–50, several instructions may require additional encodings. For example, access to a register not included within the subset of available registers in formats 20–50 may be needed. Additional instructions not included in the instructions encoded using formats 20–50 may be needed. For these and other reasons, the extend opcode and extended instruction formats 60–80 are defined.

Instruction decompressor 12 examines opcode field 22 in order to detect the extend opcode. The extend opcode is one of the opcodes defined to use instruction format 50 in the present embodiment, although the bits included in immediate field 52 are assigned differing interpretations depending upon the extended instruction format coded for the particular extended instruction. The extended instruction formats include a second opcode field (e.g. fields 66 and 78) which identify the particular extended instruction.

Addition of the extend opcode and extended instruction formats allows for many instructions to be encoded using the narrower instruction formats 20–50, but still have the flexibility of the wider extended instruction formats when desired. Programs which occasionally make use of the functionality included in the extended instruction formats may still achieve a reduced memory footprint, since these programs may be encoded using compressed instructions and many of the compressed instructions may comprise 16-bit compressed instructions.

An embodiment of microprocessor 10 may handle the extended instructions by fetching 16-bit instruction portions and detecting the extend opcode. When the extend opcode is detected, a NOP may be transmitted to processor core 16 and the remaining 16-bit portion of the extended instruction may be fetched. The extended instruction is decompressed and provided as the next instruction after the NOP.

Additionally, instruction decompressor 12 handles cases wherein a portion of the extended instruction is available while a second portion is unavailable. For example, two portions of the extended instruction may lie within two distinct cache lines within instruction cache 14. Therefore, one portion of the instruction may be fetched from instruction cache 14 while the other portion may not reside within instruction cache 14. The portion may then need to be stored within instruction decompressor 12 until the remaining portion is available.

Figure 4D:
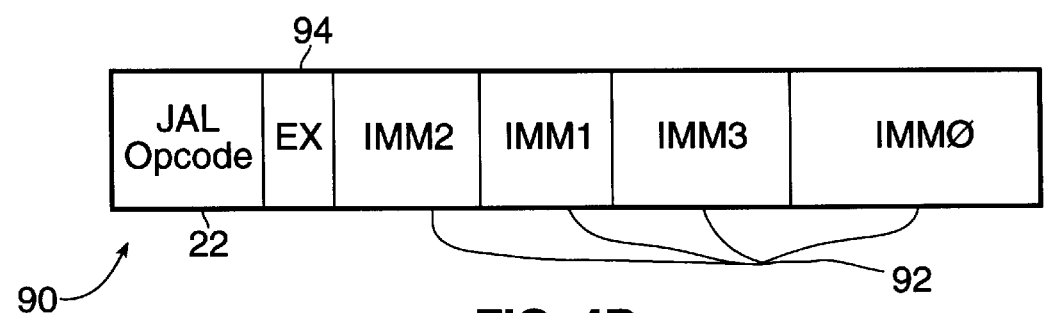
FIG. 4D is an eight instruction format supported by one embodiment of the microprocessors shown in FIGS. 1 and 2.

Finally, FIG. 4D is an instruction format 90 used to explicitly expand the JAL instruction of the MIPS RISC instruction set. The JAL instruction is often used as a subroutine call instruction. Subroutines may be stored in memory at a great distance (address-wise) from the calling routine. Therefore, having the largest possible range of relative offsets (via an immediate field 92 comprising 26 bits) is important for the JAL instruction. Additionally, an exchange bit 94 is included in the instruction encoding. The exchange bit is used to indicate the compressed/non-compressed nature of the instructions at the target address. If the bit is set, the target instructions are compressed instructions. If the bit is clear, the target instructions are non-compressed instructions. The value of exchange bit 94 is copied into bit 0 of the program counter within processor core 16. Bit 0 of the program counter may always be assumed to be zero, since the sixteen bit and thirty-two bit instructions occupy at least two bytes each and instructions are stored at aligned addresses. Therefore, bit zero is a useful location for storing the compression mode of the current routine. Processor core 16 increments fetch addresses by 2 (instead of 4) when bit 0 is set, thereby fetching 16 bit compressed instructions through instruction decompressor 12.

Each instruction within the compressed instruction set employed by microprocessor 10 uses at least one of the instruction formats shown in FIGS. 3A–3D and FIGS. 4A–4D. It is noted that opcode field 22 is included in each instruction format, and is located in the same place within each instruction format. The coding of opcode field 22 determines which instruction format is used to interpret the remainder of the instruction. A first portion of the opcode field encodings is assigned to instruction format 20; a second portion of the opcode field encodings is assigned to instruction format 30; etc.

As used herein, the term "instruction field" refers to one or more bits within an instruction which are grouped and assigned an interpretation as a group. For example, opcode field 22 is comprises a group of bits which are interpreted as the opcode of the instruction. Additionally, first and second register fields 24 and 26 comprise register identifiers which identify a storage location within processor core 16 which store operands of the instruction. Additionally, the term immediate field refers to an instruction field in which immediate data is coded. Immediate data may provide an operand for an instruction. Alternatively, immediate data may be used as an offset to be added to a register value, thereby producing an address. Still further, immediate data may be used as an offset for a branch instruction.

FIGS. 5A–6F are tables listing an exemplary compressed instruction set for use by one particular implementation of microprocessor 10. The particular implementation employs the MIPS RISC architecture within processor core 16. Therefore, the instruction mnemonics listed in an instruction column 100 of the tables correspond to instruction mnemonics defined in the MIPS RISC architecture (or defined for the instruction assembler, as described in "MIPS RISC Architecture" by Kane and Heinrich, Appendix D, Prentice Hall PTR, Upper Saddle River, N.J., 1992, incorporated herein by reference) with the following exceptions: CMPI, MOVEI, MOVE, NEG, NOT, and extend. These instructions translate to the following MIPS instructions (RS and RT refer to the 16-bit RS and RT):

| | | |
|---|---|---|
| CMPI | XORI | $24, RS, imm8 |
| MOVI | ADDIU | RS, $0, simm8 |
| MOV | ADD | RS, $0, RT |
| NEG | SUB | RS, $0, RT |
| NOT | NOR | RS, $0, RT |
| extend | (described above) | |

Additionally, the instruction tables use several symbols. In an operands column 102, the symbols rs, rt, xs, xt, and rd are used. Rs and xs refer to second register field 26 (or second register field 76), while rt and xt refer to first register field 24 (or first register field 74). Similarly, rd refers to third instruction field 32 (or third instruction field 82). As mentioned for one embodiment above, first register field 24, second register field 26, and third register field 32 comprise three bits each. Table 1 below lists the mapping of the field encodings (listed in binary) to registers in the MIPS RISC architecture for these symbols. Other mappings are also contemplated, as shown further below. Names assigned according to MIPS assembler convention are also listed in Table 1.

TABLE 1

Register Mappings

| Field Encoding | RS, RT, RD | XS, XT |
|---|---|---|
| 000 | $8 (t0) | $24 (t8) |
| 001 | $1 (at) | $17 (s1) |
| 010 | $2 (v0) | $18 (s2) |
| 011 | $3 (v1) | $19 (s3) |
| 100 | $4 (a0) | $28 (gp) |
| 101 | $5 (a1) | $29 (sp) |
| 110 | $6 (a2) | $30 (s8) |
| 111 | $7 (a3) | $31 (ra) |

As shown in table 1, up to 16 registers are available for use in compressed instructions having registers fields 24, 26, or 32. Because each register field is three bits, only eight registers are available for a given opcode. Instructions which may access all sixteen registers are assigned two opcodes in the instruction tables below. Register selection is thereby a function of both a register field and opcode field 22. Advantageously, register fields may be encoded using fewer bits while still providing select instructions which may access a large group of registers.

Also listed in operands column 102 are symbols for the immediate fields 32, 42, 64, and 72. The symbol "imm" indicates an immediate field is included. If "imm" is preceded by an "s", the immediate field is signed and the decompression of the immediate field into the decompressed instruction is performed by sign extending the immediate field. If "imm" is not preceded by an "S", the immediate field is unsigned and immediate field decompression involves zero extending the immediate field. In one embodiment, immediate field decompression for load/store instructions comprises right rotation of the immediate bits by one bit for halfwords and two bits for words, followed by shifting of the immediate bits left by one bit for halfwords and two bits for words. Effectively, a seven bit immediate field is provided for words and a six bit immediate field for halfwords (in the 16-bit instruction formats). The MIPS RISC architecture defines that data addresses corresponding to load/store instructions are aligned for each instruction included in the exemplary compressed instruction set. Therefore, the least significant bit (for halfwords) and the second least significant bit (for words) may be set to zero. Bits in the compressed immediate field need not be used to specify these bits. Finally, "imm" is post-fixed with a number indicating the number of bits included in the immediate field.

Opcode field 22 and function field 28 are decompressed as well. More particularly, opcode field 22 and function field 28 identify the instruction within the MIPS RISC architecture, in accordance with the tables shown in FIGS. 5A–6F. The opcode and function fields of the decompressed instructions are coded in accordance with the MIPS RISC architecture definition.

FIGS. 5A and 5B depict a table 110 and a table 112, respectively. Tables 110 and 112 list instructions from the exemplary compressed instruction set which use instruction format 20 shown in FIG. 3A. Instruction column 100 and operands column 102 are included, as well as an opcode column 106 and a function column 104. Opcode column 104 and function column 106 include hexadecimal numbers, and correspond to opcode field 22 and function field 28, respectively.

Table 110 includes several instructions which have an "imm5" coding in function column 104. The "imm5" coding appears for the load/store instructions within table 110, and indicates that function field 28 is used as an immediate field for these instructions. For other instructions, function field 28 is used in conjunction with opcode field 22 to identify a particular instruction within the compressed instruction set.

Additionally, opcode 1d is labeled as special in table 110. The special instructions have a specific interpretation of function field 28. In particular, if the most significant bit of the function field is clear, then the instruction is defined to be:

ADDIU rt, rs, simm4 wherein the "simm4" operand is formed from the remaining bits of function field 28. If the most significant bit of function field 28 is set, the instruction is defined to be:

ADDIU xt, xs, simm4 except for two special cases. If second register field 26 is coded to a zero, then the instruction is:

MOVEI xt, imm4 wherein again the imm4 operand is formed from the remainder of function field 28. Lastly, if second register field 26 is coded to 5 (hexadecimal), then the instruction is defined to be:

ADDIU sp, simm9 wherein the simm9 operand is formed from the remaining bits of function field 28 and first register field 24. The low order two bits of the simm9 operand are set to zero.

It is noted that the destination of the SLT and SLTU instructions shown in table 110 is the t8 register (register $24) according to one embodiment.

Table 112 shows an "imm3" and "imm6" operand for several instructions. The imm3 operand is coded into second register field 26, and the "imm6" operand is coded into both second register field 26 and first register field 24.

Additionally, table 112 includes the jump register (JR) instruction, having second register field 26 as an operand. However, it is noted that in one embodiment subfield RT1 of first register field 24 is used in conjunction with second register field 26 to specify any of the MIPS RISC architecture registers for the JR instruction.

Turning now to FIG. 5C, a table 114 including instruction column 100, operands column 102, opcode column 106, and function column 104. Table 114 lists instructions from the exemplary instruction set which use instruction format 30 shown in FIG. 3B. Certain instructions within table 114 have hardcoded destination registers (i.e. the destination registers cannot be selected by the programmer, other than by using a different opcode). For these instructions, third register field 32 is combined with function field 34 to store the function field encoding shown in function column 104. Additionally, an instruction is shown which has an immediate operand in function column 104 and operands column 102. This instruction uses second register field 26 in conjunction with function field 34 to code the corresponding immediate field used by the instruction.

FIGS. 5D and 5E are tables 116 and 118 showing the instructions from the exemplary compressed instruction set which employ instruction formats 40 and 50, respectively. It is noted that the extend instruction is shown in table 118. However, the extend instruction actually indicates that the instruction is a 32-bit compressed instruction which uses one of instruction formats 60, 70, or 80.

Figure 6B:
Figure 6E:
Figure 6F:

Turning now to FIGS. 6A and 6B, a table 120 and a table 122 are shown. Tables 120 and 122 depict those instructions from the exemplary compressed instruction set which are encoded using instruction format 70, shown in FIG. 4B.

Table 120 includes instruction column 100 and operands column 102, and further includes an opcode column 108. Opcode column 108 is similar to opcode column 106, except that the opcode encodings shown in opcode column 108 correspond to opcode field 78.

Table 122 includes an RT column 109 which corresponds to first register field 74. The coding of the RT field in the instructions shown in table 122 indicates which instruction is selected. The instructions shown in table 122 share a specific encoding in opcode field 78. In one embodiment, the specific encoding is 00 (hexadecimal).

FIGS. 6C, 6D, 6E, and 6F are tables 124, 126, 128, and 130 which depict instructions from the exemplary compressed instruction set which are encoded according to instruction format 80. Tables 124, 126, and 130 include a function column 107 which corresponds to encodings of function field 84. Table 128 includes an RS, RT column 105 which will be explained in more detail below.

Operands column 102 for table 124 includes immediate perands for certain instructions. The "imm5" operand is coded into second register field 76. The "imm15" operand is coded into a combination of first register field 74, second register field 76, and third register field 82.

The instructions listed in table 128 are identified via encodings of second register field 76, as shown in RS, RT column 105. Certain instructions are identified via second register field 76 in conjunction with first register field 74. Those instructions for which RS, RT column 105 includes an asterisk for the RT portion are identified via second register field 76, while those instructions for which RS, RT column 105 does not include an asterisk are identified by second register field 76 in conjunction with first register field 74. Instructions which are not identified via first register field 74 may use first register field 74 to encode an operand. The instructions listed in tables 128 and 130 are instructions for which COPO bit 86 is set, while instructions listed in tables 124 and 126 are encoded with COPO bit 86 clear.

Certain instructions in table 128 include an "imm6" operand. The "imm6" operand is coded into function field 84. Additionally, function field 84 is used to indicate the instructions shown in table 130 when second register field 76 is coded to 1x (hexadecimal), wherein "x" indicates that the low order bits are don't cared.

Figure 7:
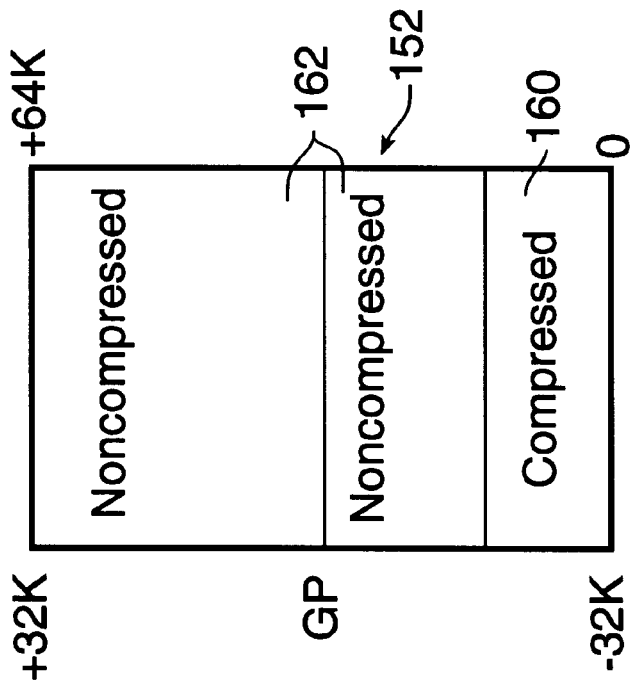
FIG. 7 is a diagram depicting offsets from an arbitrary register and a global pointer register, according to one embodiment of the microprocessors shown in FIGS. 1 and 2.
Figure 7:
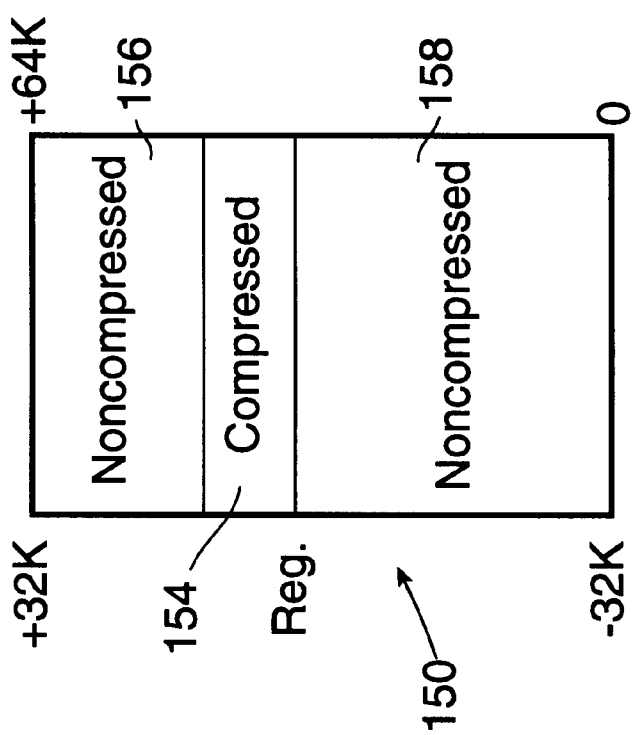

Turning now to FIG. 7, a first addressing window 150 and a second addressing window 152 are shown according to one embodiment of microprocessor 10. At the center of addressing window 150 is the value of a base register (represented as Reg. on the left side of addressing window 150). The value of the base register identifies an address within the main memory subsystem. Addressing window 150 represents the range of addresses around the value of the base register which are accessible to a load/store instruction in the non-compressed instruction set according to one embodiment of the non-compressed instruction set. The non-compressed instruction set specifies that load/store instructions form the address of a memory operand via the sum of a value stored in a base register and a sixteen bit signed immediate field . In such an embodiment, the range of addresses has an upper boundary of 32767 greater than the base register and a lower boundary of 32768 less than the base register. Other embodiments may include larger or smaller ranges. As used herein, the term "base register" refers to a register which is specified by a load/store instruction as storing a base address, to which the signed immediate field is added to form the address of the memory operand operated upon by the instruction.

As shown in table 110, f or example, load/store instructions within the 16-bit portion of the exemplary compressed instruction set include a five bit immediate field. This field is rotated right two bits and then shifted left two bits for word-sized memory operands, forming a seven bit immediate field (the largest of the immediate fields which may be formed using the five bits, according to one embodiment). The seven bit immediate field is then zero extended to form a positive offset from the base register in the corresponding decompressed instruction. A subrange 154 of addresses are therefore available for access by compressed instructions. Within addressing window 150, subrange 154 has an upper boundary of 127 greater than the base register and a lower boundary of the base register. However, subrange 154 may vary in size from embodiment to embodiment.

While subrange 154 may work well for many load/store instructions, a different subrange may be employed for use with the global pointer register. The global pointer register is a register assigned by software convention to locate an area of memory used for storing global variables. A global variable is a variable which is available for access from any routine within a program. In contrast, a local variable is typically accessible only to a particular routine or group of routines. In the MIPS instruction set, for example, register $28 is often used as the global pointer register.

The area of memory around the global pointer register may therefore be viewed as a table of global variables. Each global variable is assigned an offset within the table. The offset corresponds to a particular immediate field value which may be added to the global pointer register in order to locate the global variable. For the embodiment shown in FIG. 7, for example, a 64 kilobyte table may be allocated for global variables as shown along the left side of addressing windows 150 and 152.

If compressed immediate fields are decompressed as described for addressing window 150, then the global variable table includes a section which is accessible to compressed instructions (corresponding to subrange 154) which is between two subranges 156 and 158 accessible to non-compressed instructions. As noted above, microprocessor 10 may support programs in which some routines are coded with non-compressed instructions while other routines are coded with compressed instructions. Allocating global variables in a particular program is complicated by the division of the non-compressed global variable subranges 156 and 158 of addressing window 150. Global variables may be allocated into subrange 158, for example, and then global variable allocation must continue in subrange 156 (for non-compressed instructions). In other words, subrange 154 must be bypassed for global variables accessible to non-compressed instructions.

Microprocessor 10 may employ a decompression of the compressed immediate field for load/store instructions using the global pointer (GP) register which leads to addressing window 152. Addressing window 152 includes a subrange 160 accessible to compressed instructions and a subrange 162 accessible to non-compressed instructions. Advantageously, subrange 162 is a contiguous block of memory. Global variables for access by non-compressed instructions may be allocated into subrange 162, while global variables for access by compressed instructions may be allocated into subrange 160. Essentially, subrange 160 and subrange 162 form distinct tables of global variables for access by compressed and non-compressed instructions, respectively.

Addressing window 152 is achieved by decompressing the compressed immediate field as described above, except that the most significant bit of the decompressed immediate field is set. If the compressed immediate field is coded with binary zeros, then the decompressed immediate field is 8000 (in hexadecimal). Since the decompressed immediate field is interpreted as a signed field for load/store instructions, the 8000 value is the most negative number available in the decompressed immediate field. Other encodings of the compressed immediate field are decompressed into negative numbers which form subrange 160. Subrange 160 forms the lower boundary of the range of addresses represented by addressing window 152 as shown in the embodiment of FIG. 7.

As used herein, the term memory operand refers to a value stored in a memory location within the main memory subsystem. Load instructions may be used to transfer the memory operand to a register within microprocessor 10. Conversely, store instructions may be used to transfer a value stored in a register into the memory operand storage location. A memory operand may be of various sizes (i.e. numbers of bytes). In one embodiment, three sizes are available: byte, halfword, and word. A halfword comprises two bytes, and a word comprises four bytes. Other memory operand sizes are contemplated for other embodiments.

Figure 8:
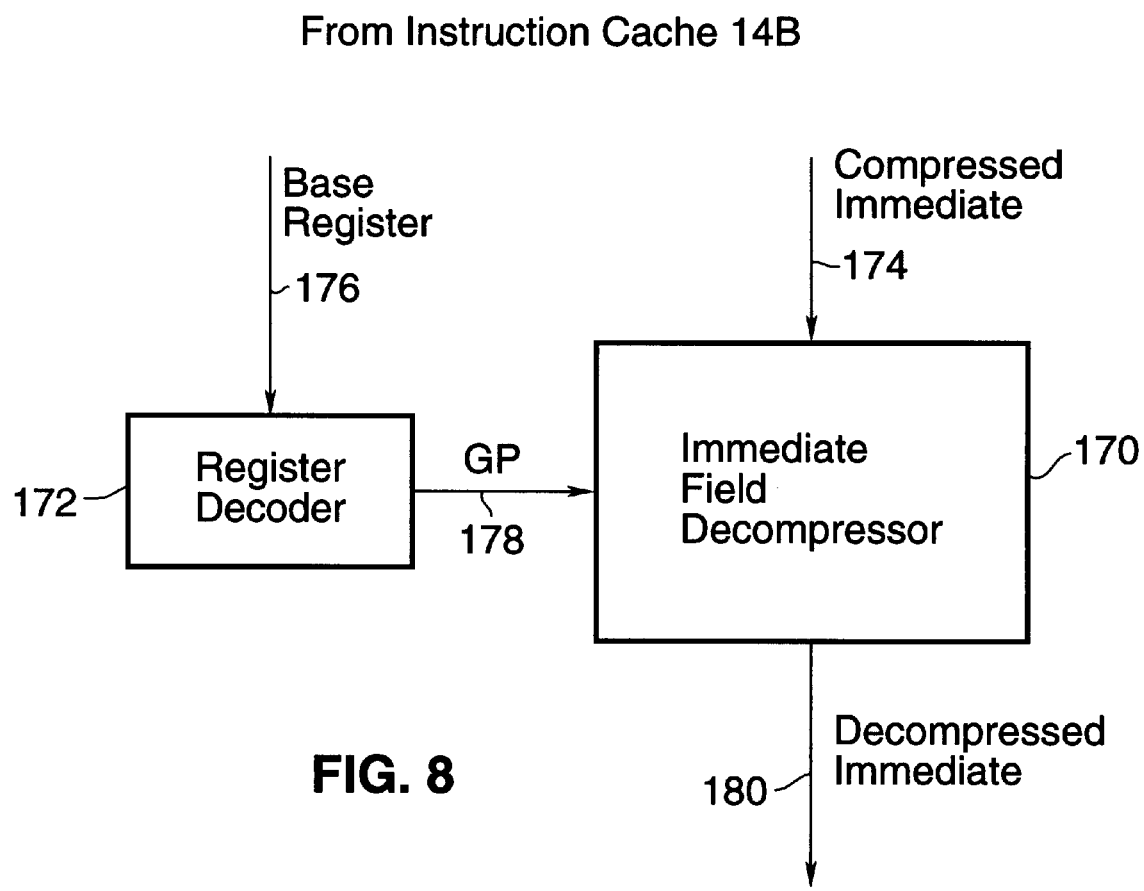
FIG. 8 is a block diagram of exemplary hardware for expanding an immediate field from a compressed instruction to a decompressed instruction.

Turning to FIG. 8, a block diagram of exemplary hardware within instruction decompressor 12 for decompressing the immediate field of a load/store instruction is shown. It is noted that multiple copies of the exemplary hardware shown in FIG. 8 may be employed to concurrently decompress multiple load/store instructions. The exemplary hardware shown in FIG. 8 is described in terms of microprocessor 10B. However, similar hardware may be employed within microprocessor 10A. The exemplary hardware includes a immediate field decompressor 170 and a register decoder 172.

When an instruction is conveyed to instruction decompressor 12B from instruction cache 14B, a portion of the instruction comprising the compressed immediate field for load/store instructions is conveyed to immediate field decompressor 170 upon a compressed immediate bus 174. For the exemplary instruction set described in FIGS. 3A–6F, the compressed immediate field comprises function field 28 (shown in FIG. 3A). Additionally, the base register field for the compressed load/store instruction is conveyed upon a base register bus 176. For the exemplary instruction set shown in FIGS. 3A–6F, the base register field comprises second register field 26.

Register decoder 172 decodes the register identified upon base register bus 176. If the base register is the global pointer register, register decoder 172 asserts a GP signal upon GP line 178 to immediate field decompressor 170. Otherwise, register decoder 172 deasserts the GP signal.

Immediate field decompressor 170 decompresses the compressed immediate field in one of two ways, dependent upon the GP signal. If the GP signal is deasserted, then immediate field decompressor 170 clears the most significant bit of the de compressed immediate field. Conversely, immediate field decompressor 170 sets the most significant bit of the immediate field if the GP signal is asserted. Therefore, a positive offset is created when a register other than the global pointer register is used as the base register. A negative offset is created when the global pointer register is used as the base register. Immediate field decompressor 170 conveys the decompressed immediate field upon a decompressed immediate bus 180.

Figure 9:
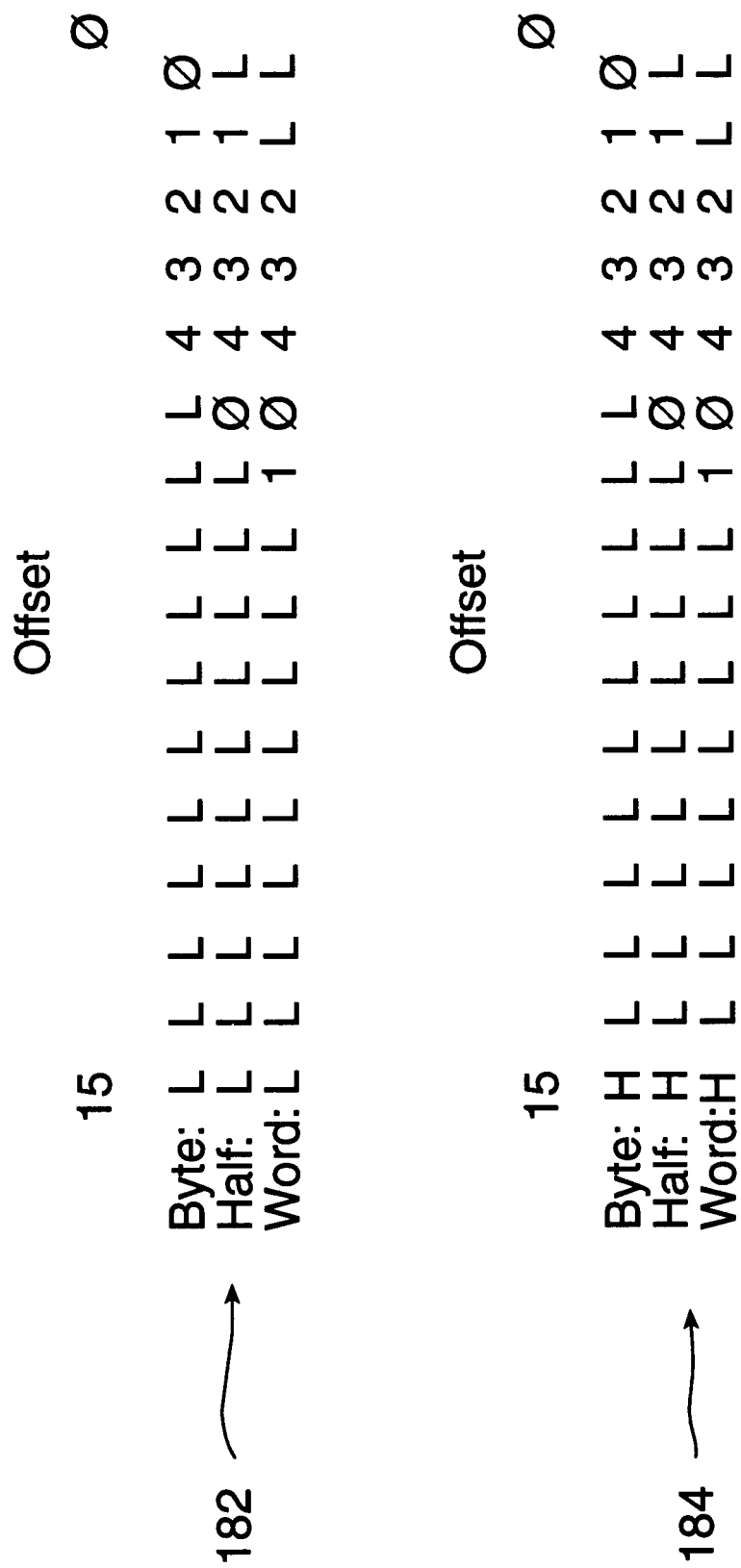
FIG. 9 is a diagram depicting decompressed offsets in accordance with one embodiment of the microprocessors shown in FIGS. 1 and 2.

FIG. 9 illustrates the decompressed immediate field generated for load/store instructions according to one embodiment of the exemplary compressed instruction set. The compressed immediate field of load/store instructions which do not employ the global pointer register as the base register are decompressed as indicated by reference number 182. The decompression for bytes, halfwords, and words are shown separately, with each bit position of the decompressed immediate field (or offset) represented by a numerical digit or an "L". Bits from the compressed immediate field are shown in the respective bit locations of the decompressed field via the numerical digits. The least significant bit of the compressed immediate field is represented by the digit 0, and the most significant bit of the compressed immediate field is represented by a 4. The letter "L" is used to indicate a bit position which is set to a binary zero.

Decompressed immediate fields corresponding to bytes, halfwords, and words for load/store instructions which use the global pointer register as a base register are indicated by reference number 184. Similar to the decompressed fields indicated by reference number 182, the decompressed fields indicated by reference number 184 depict numerals in bit positions which are filled with a bit from the compressed immediate field and the letter "L" is used to indicate a bit position which is set to a binary zero. Additionally, the most significant bit of each decompressed offset is set to a binary one (indicated by the letter "H").

Figure 10:
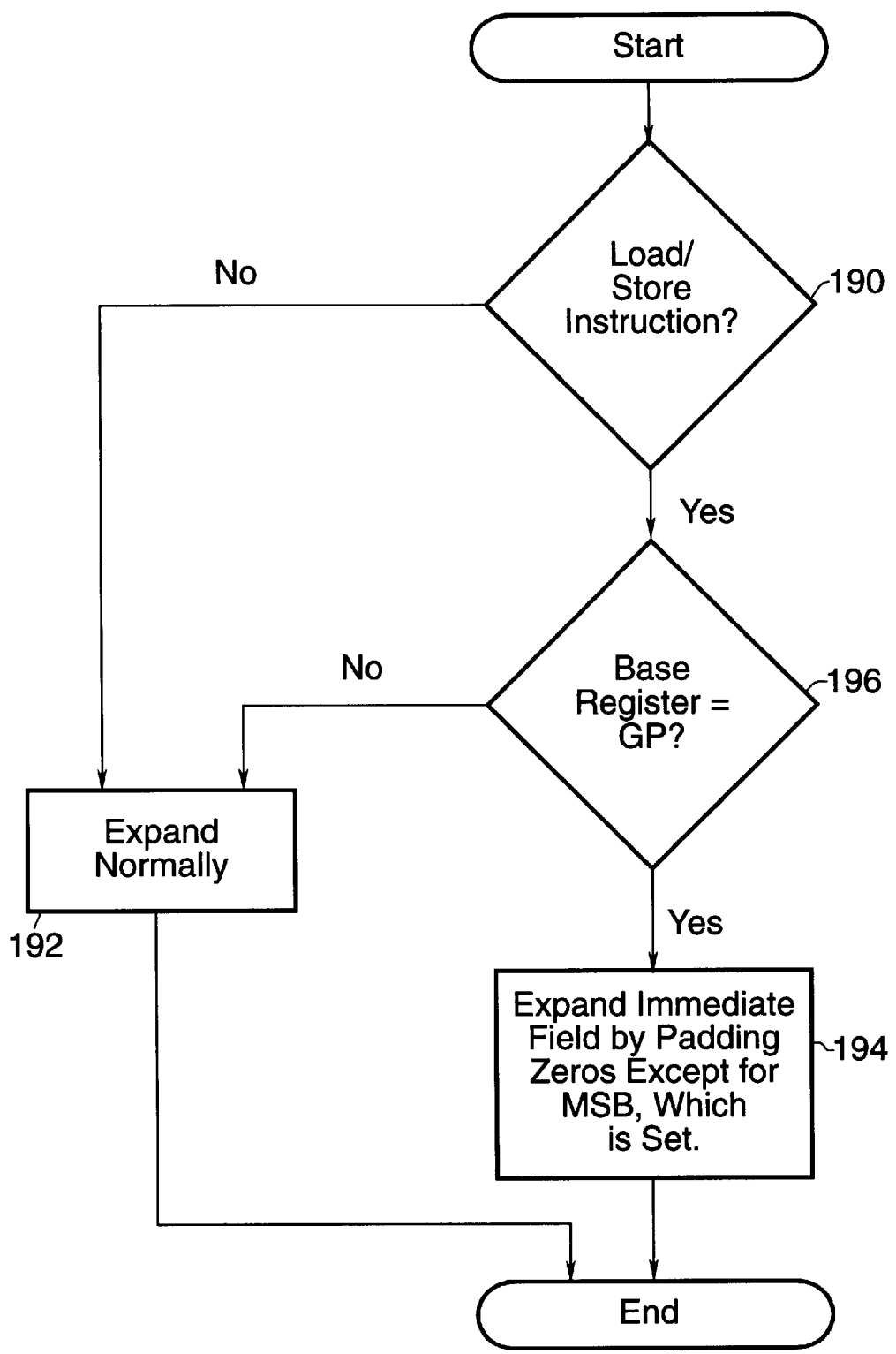
FIG. 10 is a flow chart depicting operation of a decompressor for immediate fields according to one embodiment of the microprocessors shown in FIGS. 1 and 2.

Turning next to FIG. 10, a flow chart is shown depicting activities performed by instruction decompressor 12 in order to decompress instructions in accordance with the embodiment shown in FIG. 8. Although the steps shown in FIG. 10 are illustrated as serial in nature, it is understood that various steps may be performed in parallel.

Instruction decompressor 12 determines if a received instruction is a load/store instruction (decision block 190). If the instruction is not a load/store instruction, the instruction is expanded in accordance with a mapping between the compressed instructions (as illustrated in FIGS. 3A–6F) and the corresponding decompressed instructions (step 192). If the instruction is a load/store instruction, then the base register specified by the instruction is examined (decision block 196). If the base register is the global pointer register, the immediate field is decompressed as indicated by reference number 184 in FIG. 9 (step 194). Alternatively, if the base register is not the global pointer register, the immediate field is decompressed as indicated by reference number 182 in FIG. 9 (step 192).

Figure 11:
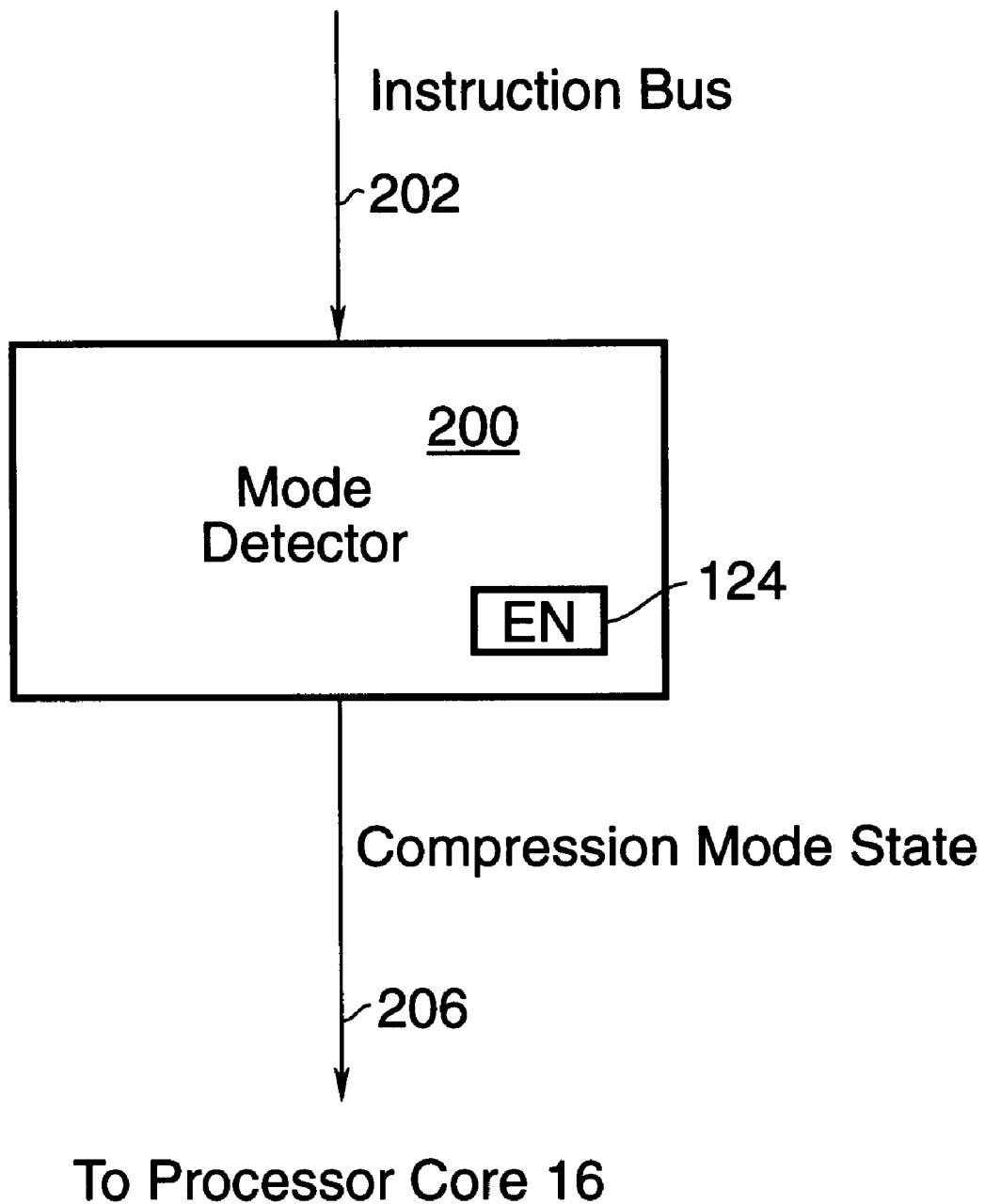
FIG. 11 is a block diagram of exemplary hardware for generating fetch addresses according to one embodiment of the microprocessors shown in FIGS. 1 and 2.

In addition to decompressing load/store offsets in a different manner for the global pointer register, microprocessor 10 also supports a compression mode for indicating which type of instructions are being executed by microprocessor 10 (i.e. compressed or non-compressed). FIG. 11 is a block diagram illustrating a portion of one embodiment of instruction decompressor 12. The illustrated portion determines the compression mode for each routine executed by microprocessor 10. The portion shown may be suitable for microprocessor 10B, and a similar portion may be employed by microprocessor 10A. FIG. 11 depicts a mode detector 200.

When an instruction is fetched by processor core 16, the instruction is received upon an instruction bus 202 by mode detector 200. Mode detector 200 detects when the jump and link (JAL) instruction is fetched, and further examines the exchange bit 94. If exchange bit 94 is set, the routine at the target address of the JAL instruction comprises compressed instructions. Therefore, the compression mode of the target routine is compressed. Alternatively, exchange bit 94 may be clear. In this case, the compression mode of the target routine is uncompressed.

In addition to specifying the compression mode for the target routine, the JAL instruction causes the address of the instruction following the JAL instruction to be stored into register $31 of the MIPS RISC architecture. This register may subsequently be used with the JR instruction to return from the target routine. Because the compression mode is stored as part of the address in this embodiment, the compression mode of the source routine is restored upon execution of the JR instruction. Advantageously, routines encoded in compressed instructions may be intermixed with routines encoded in non-compressed instructions. The new compression mode is conveyed to processor core 16 upon a compression mode line 206. It is noted that mode detector 200 may be included as a part of processor core 16 instead of instruction decompressor 12, in alternative embodiments.

The embodiment of mode detector 200 shown in FIG. 11 includes a storage 204 for a compression enable bit. If compression is enabled, the compression enable bit is set. When instructions are fetched in compressed mode and compression is enabled, instruction decompressor 12 decompresses the instructions. If the enable bit is clear, instruction compression is disabled for microprocessor 10. Instruction decompressor 12 is bypassed when instruction decompression is disabled. Furthermore, mode detector 200 indicates that the compression mode is non-compressed when instruction compression is disabled.

As used herein, a routine is an ordered set of instructions coded for execution by microprocessor 10. The routine may be coded in either compressed or non-compressed instructions, and is delimited by a subroutine call instruction and a return instruction. The delimiting subroutine call instruction is not included within the routine. Instead, the subroutine call instruction indicates the beginning of the routine via a target address included with the subroutine call instruction. The first instruction of the routine is stored at the target address. Additionally, the address of an instruction within the routine including the subroutine call instruction is saved so that a return instruction may be executed to return to the calling routine. In the exemplary compressed instruction set depicted in FIGS. 3A–6F, the jal instruction may serve as a subroutine call instruction. Alternatively, the jalr instruction may serve as a subroutine call instruction.

A routine ends with a return instruction, which causes subsequent instruction execution to return to the address saved when the corresponding subroutine call instruction is executed. In other words, the target address of the return instruction is the saved address. For the exemplary compressed instruction set, the jr instruction may serve as a return instruction. Generally speaking, a target address is an address at which instruction fetching is to begin upon execution of the instruction corresponding to the target address.

Figure 12:
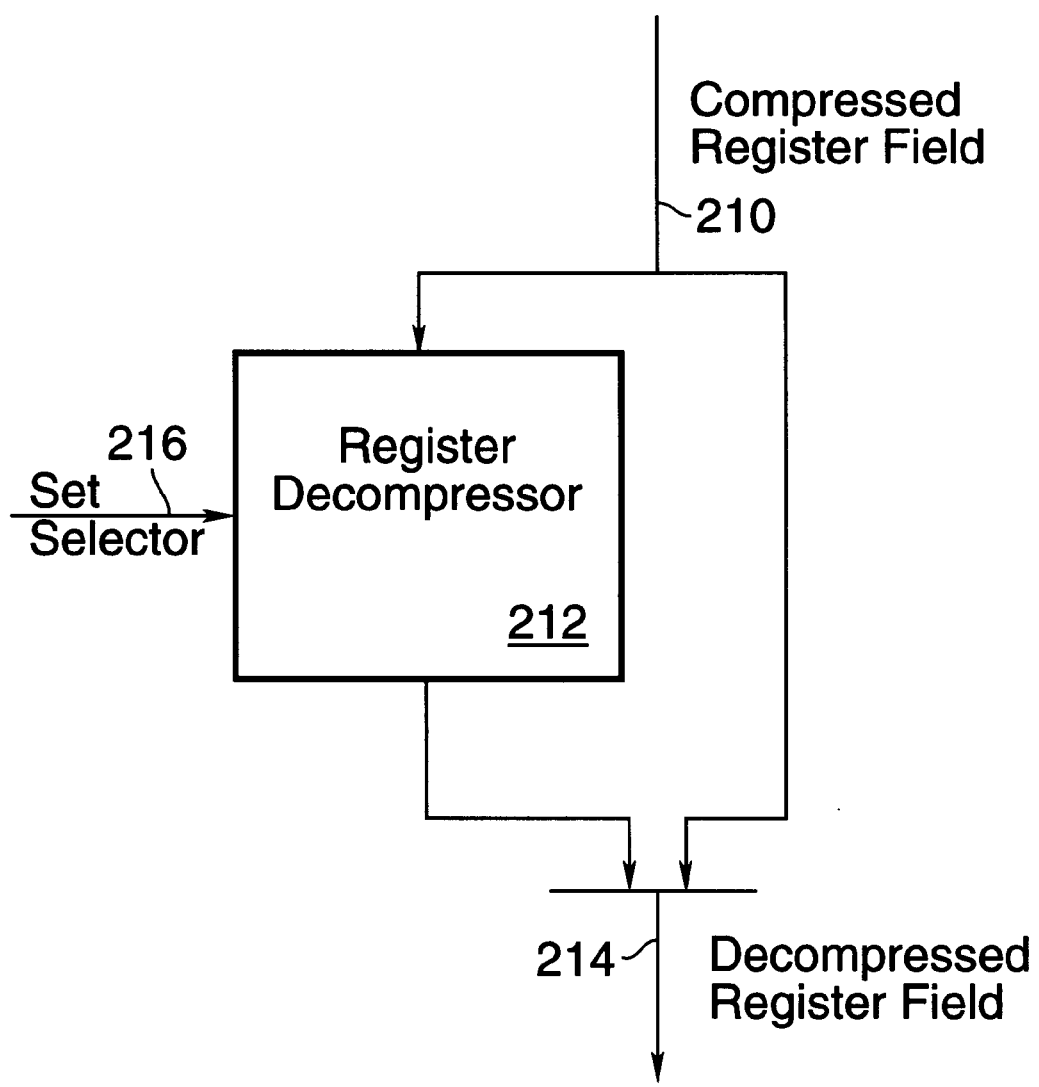
FIG. 12 is a block diagram showing register decompression logic employed in one embodiment of the microprocessors shown in FIGS. 1 and 2.

Turning next to FIG. 12, a block diagram of one embodiment of register field decompression is shown. Other embodiments of register field decompression a re contemplated. The compressed register field corresponding to an instruction is conveyed upon compressed register field bus 210. A register decompressor block 212 receives the compressed register field. Additionally, at least a portion of the compressed register field is incorporated into the decompressed register field which is then conveyed upon decompressed register field bus 214. The decompressed register field is thereby formed by concatenating at least a portion of the compressed register field to the value generated by register decompressor block 212.

In one embodiment, the entire compressed register field is concatenated into the decompressed register field. Additionally, the remaining portion of the decompressed register field depends upon which register set the instruction accesses (e.g. xs vs. rs and xt vs. rt). A set selector signal is received upon set selector bus 216 for each register, indicating whether the xs (xt) or the rs (rt) register set should be used. If the set selector signal is asserted, then xs (xt) is selected. Otherwise, rs (rt) is selected. The set selector signal is asserted or deasserted based upon the opcode of the instruction being decompressed, in accordance with the exemplary compressed instruction set shown in FIGS. 5A–6F. For example, the register mapping between compressed and decompressed registers shown in Table 1 may be employed. For such an example, register decompressor 212 may employ the following logic, wherein DR represents the decompressed register field, CR represents the compressed register field, and RH represents the corresponding set selector signal value:

DR[4:3]={RH, (RH & CR[2]|!CR[2:0])}

Several other register mappings are contemplated, examples of which are shown in tables 2–4 below, along with corresponding Verilog logic equations. It is noted that any register mapping may be employed by various embodiments of microprocessor 10.

TABLE 2

Second Exemplary Register Mappings

| Field Encoding | RS, RT, RD | XS, XT |
|---|---|---|
| 000 | $8 (t0) | $24 (t8) |
| 001 | $9 (t1) | $25 (t9) |
| 010 | $2 (v0) | $18 (s2) |
| 011 | $3 (v1) | $19 (s3) |
| 100 | $4 (a0) | $28 (gp) |
| 101 | $5 (a1) | $29 (sp) |
| 110 | $6 (a2) | $30 (s8) |
| 111 | $7 (a3) | $31 (ra) |

DR[4:3] = {RH, (RH & CR[2] | !CR[2:1])}

TABLE 3

Third Exemplary Register Mappings

| Field Encoding | RS, RT, RD | XS, XT |
|---|---|---|
| 000 | $16 (s0) | $24 (t8) |
| 001 | $1 (at) | $9 (t1) |
| 010 | $2 (v0) | $10 (t2) |
| 011 | $3 (v1) | $11 (t3) |
| 100 | $4 (a0) | $28 (gp) |
| 101 | $5 (a1) | $29 (sp) |
| 110 | $6 (a2) | $30 (s8) |
| 111 | $7 (a3) | $31 (ra) |

DR[4:3] = {(RH & CR[2] | !CR[2:0]), RH}

TABLE 4

Fourth Exemplary Register Mappings

| Field Encoding | RS, RT, RD | XS, XT |
|---|---|---|
| 000 | $16 (s0) | $24 (t8) |
| 001 | $17 (s1) | $25 (t9) |
| 010 | $2 (v0) | $10 (t2) |
| 011 | $3 (v1) | $11 (t3) |
| 100 | $4 (a0) | $28 (gp) |
| 101 | $5 (a1) | $29 (sp) |
| 110 | $6 (a2) | $30 (s8) |
| 111 | $7 (a3) | $31 (ra) |

DR[4:3] = {(RH & CR[2] | ! CR[2:1]), RH}

As indicated by the assembler assigned names shown in tables 1–4, various registers are assigned to various functions by software convention. For example, the MIPS assembler assigns the following meanings to registers:

TABLE 5

Software Convention for Register Names

| Register | Software Name | Use |
|---|---|---|
| $0 | none | Hardwired to zero |
| $1 | $at | used by assembler |
| $2..$3 | v0–v1 | Function results or static link |
| $4..$7 | a0–a3 | arguments for a subroutine |
| $8..$15, $24..$25 | t0–t9 | Temporary registers, not saved between subroutine calls |
| $16..$23, $30 | s0–s8 | Saved between subroutine calls |
| $26..$27 | k0–k1 | Reserved for operating system |
| $28 | gp | Global Pointer |
| $29 | sp | Stack Pointer |
| $31 | ra | Return address |

It is desirable to provide access to both temporary and saved registers to routines coded in compressed instructions. Additionally, access to v0-v1, a0-a3, gp, sp, and ra are needed to operate with existing software. The register mappings shown balance these qualities with the desire for register decompressor 212 to occupy a fairly small number of gates. Advantageously, a useful set of registers is selected from the MIPS register set while still maintaining a low gate count within register decompressor 212.

Figure 13:
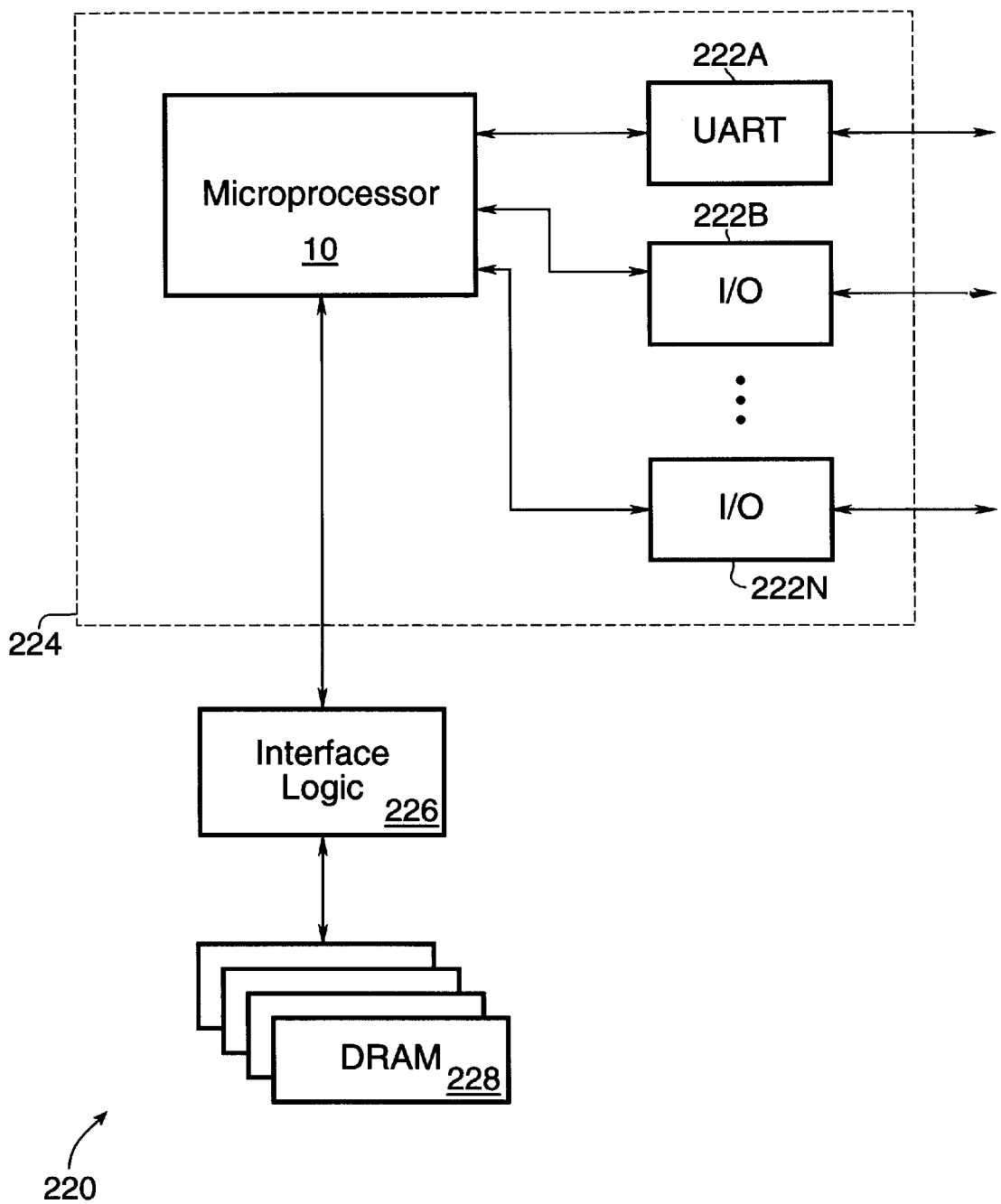
FIG. 13 is a block diagram of an exemplary computer system including the microprocessor for which embodiments are shown in FIGS. 1 and 2.

Turning now to FIG. 13, an exemplary computer system 220 including microprocessor 10 is shown. Many other computer systems employing microprocessor 10 are contemplated. Within computer system 220, microprocessor 10 is incorporated onto a semiconductor substrate 224 along with multiple I/O interfaces 222A–222N. The I/O interfaces interface to I/O devices external to substrate 224. An exemplary I/O interface 222A may be a universal asynchronous receiver/transmitter (UART).

Microprocessor 10 may be coupled to I/O interfaces 222 for communication therewith. Additionally, microprocessor 10 may be coupled to external interface logic 226, which further interfaces to one or more dynamic random access memory (DRAM) modules 228. DRAM modules 228 may store compressed and/or non-compressed instruction code, as well as data for used by the program represented by the compressed and/or non-compressed instruction code.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Although a specific example of a compressed instruction set is shown and described herein, multiple variations, extensions, and modifications may be made to the exemplary compressed instruction set. These variations, extensions, and modifications are contemplated.

The following Verilog listing describes exemplary logic for instruction decompressor 12. Many different embodiments of the logic are contemplated, although the Verilog listing shown is one suitable example:

```
'timescale 1 ns / 1 ns
module tinyrisc_dp( xo, ci, dojai, ext, x );
output[31:0]    xo;       // expanded instruction out
input[15:0]     ci;       // compressed instruction in
input           dojal;    // do jal
input           ext;      // extend
input[10:0]     x;        // extend bits
wire   ext_jal    = ext | dojal ;
/* ci[15:11] decodes */
wire   xsp        = ci[15:11] == 5'b00000 ;
wire   spany      = ~ext_jal & ci[15] & ~ci[14] & ~ci[11] ;
wire   sp1or2         = spany & ~ci[13] ;
wire   special        = sp1or2 & ~ci[12];
wire   brjal      = ci[15:12] == 4'b0001 ;
wire   br         = brjal & ~ci[11] ;
wire   word       = ci[15] & (~ext | ~ci[13]) & ci[12] & ci [11] ;
wire   special3   = ~ext_jal & ci[15:11] == 5'b11101 ;
wire   half       = ci[15] & (~ext | ~ci[13] | ~ci[12]) & ci[11] & special3;
wire   opi        = ~ci[15] & ci[14] & ~ci[12] ;
wire   opx        = ci[15:12] == 4'b0000 | ci[15] & ~ci[13] & ci[12] &
                      ci[11];
wire   sll        = ~ext_jal & ci[15:11] == 5'b10110;
wire   rtx0       = ~ext_jal & ( ~ci[15] & ~ci[14] & ci[12] & ~(ci[13] &
                      ci[11]) );
wire   snx        = ~ci[15] & ~ci[14] & (ci[13] | ~ci[12]) | ci[15:11] ==
                      5'b01001 ;
wire   special2   = sp1or2 & ci[12];
wire   ximm       = ~( xsp | br );
wire   exti       = ext & ximm ;
wire   x2z        = spany & ci[12] ;
wire   x4z        = spany | special3 ;
wire   xn         = ci[15:11] == 5'b01111 ;
wire   i11        = brjal | xn ;
wire   rsza       = ~ext_jal & ( i11 | s11 | ci[15:11] == 5'b01000 );
/* & decodes */
wire   jr         = special & ci[4:1] == 4'b0100;
wire   jalr       = jr & ci[0];
wire   negnot         = special & ci[4] & ~ci[3] & ci[1] & ci[0];
wire   rseq0      = ci[8:6] == 3'b000;
wire   sp2x       = special2 & ~ci[0] ;
wire   slt        = sp2x & ci[1] ;
wire   sp3x       = special3 & ci[4] ;
wire   sp3sp      = sp3x & ci[8:6] == 3'b101 ;
/* | decodes */
wire   i8         = ~ext_jal & ~ci[15] | sp3sp;
wire   i8s        = i8 & ~i11 ;
wire   rdrs       = sp2x & ~ci[1] | special & ci[4] ;
wire   rdrt       = special & ~(ci[4] | ci[3]) | jalr ;
wire   rdrd       = special2 & ci[0] | sll ;
wire   shrs       = ~dojal & ( brjal | ~ext & xn | ci[14:11] == 4'b0000 &
                      ci[4:2] = 3'b00 & (ext ? ~(ci[15] | ci[5] | x[10]) :
                      ci[15] ));
wire   rs5        = ext_jal | i11 | jr & ~ci[0];
wire   rsz        = rsza | sp2x & ~ci[2] & ~ci[1] | negnot | sp3x & rseq0 |
                      shrs ;
wire   rtrs       = ~ext_jal & opi | sp3sp ;
wire   rtrt       = ~( ext_jal | rtrs | jr | ~ci[15]& ·opi );
wire   snsp3      = ci[3] & special3 & ~(ci[4] & rseq0);
wire   snl        = snsp3 & ~sp3sp;
wire   snm        = ci[10] & ~ext_jal & snx | snsp3 ;
wire   snh        = snm | ci[10] & ~ext_jal & br | x[10] & exti ;
wire   sn11       = exti & half ? ci[0] : snh ;
wire   sn12       = exti & word ? ci[1] : snh ;
wire   xs         = sp2x & ci[4] | sp3x | opx ;
```

-continued

```
wire    xt       = jalr | sp2x & ci[3] | sp3x;
assign  xo[31]   = ~dojal & ci[15] & ( ext | ~x4z ) ;
assign  xo[30]   =    ext & xsp & x[10] ;
assign  xo[29]   = ~dojal & ci[14] & ~( ~ext & ci[15] & ~ci[12]
                   & ~ci[11] );
assign  xo[28]   = ~dojal & (     ci[13] & ~( spany | ~ext & word
                   | special3 ) | ~ext & ~ci[15( & ~ci[14] | br) ;
assign  xo[27]   = dojal | ci[12] & ( ext | ~( spany |
                   ci[15]&ci[14]&·ci[11] ) );
assign  xo[26]   = dojal | ci[11] ;
wire[4:0] rs     = { rs5 ? ci[10:9] : {xs,(ci[8] & xs | rseq0)},
                   ci[8:6] };
assign  xo[25:21]= rs & {5{~rsz}} ;
wire[4:0] rt     = { xt, (ci[10] ? xt : ~(ci[9] | ci[5])), ci[10:9],
                   ci[5] };
assign  xo[20:16]=    rt & {5{rtrt}}
                 | rs & {5{rtrs}}
                 | x[9:5] & {5{ext_jal}}
                 | {rtx0, rtx0, 3'b00};
wire[4:0] rd     = { 1'b0, !ci[4:2], ci[4:2] };
assign  xo[15:11]=    rs & {r{rdrs}}
                 | rt & {5{rdrt}}
                 | rd & {5{rdrd}}
                 | x[4:0] & {5{ext & ~ximm | dojal}}
                 | { {2{slt | snh}}, snh, sn12, sn11 };
assign  xo[10:6]
        =   rs & {{2{shrs}}, {3{shrs|sll}}}
          | ci[15:11] & {5{dojal}}
          | x[4:0] & {5{exti}}
          | { ci[1]&sll, ci[0]&sll, 1'b0, ci[10]& i8s, ci[9]&i8s |
             ci[1]& ~ext_jal&word}
          | { snm, snm, snm, snl, snl };
assign  xo[5]    = ci[5] & (ext_jal | i8) | ci[4] & special
                 | ci[0] & ~ext_jal & half | special 2 | snl ;
assign  xo[4]    = ci[4] & ~x4z | ci[1] & sp3sp | snl ;
assign  xo[3]    = sp3sp ? ci[0] : ci[3] & ~x2z | slt ;
assign  xo[2]    = ci[2] & ~x2z;
assign  xo[1]    = ci[1] & ~( ~dojal & word | sll | sp3p );
assign  xo[0]    = ci[0] & ~( ~dojal & half | sll | sp3p ) |
                   special2 & ci[2] ;
endmodule
```

In accordance with the above disclosure, a microprocessor has been described which executes instructions from both a compressed instruction set and a non-compressed instruction set. The microprocessor expands the compressed instructions into decompressed instructions or directly decodes the compressed instructions. Advantageously, routines coded using the compressed instruction set occupy a smaller amount of memory than the corresponding routines coded in non-compressed instructions. Memory formerly occupied by such routines may be freed for use by other routines or data operated upon by such routines.

Numerous variations and modifications will become apparent to those skilled in the art once the above disclosure is fully appreciated. It is intended that the following claims be interpreted to embrace all such variations and modifications.

What is claimed is:

1. A microprocessor for executing programs created by a programmer in a variable-length instruction set comprising:

an instruction decompressor coupled to receive instructions which are members of the variable-length instruction set, wherein said variable length instruction set consists of a first plurality of instructions having a first fixed length and a second plurality of instructions having a second fixed length different from said first length, wherein said instruction decompressor is configured to convert each received instruction, which is one of said first plurality of instructions and said second plurality of instructions, into a corresponding instruction from a fixed length instruction set, wherein each of said first plurality of instructions and said second plurality of instructions comprise an opcode field and one or more operand fields, and wherein said first plurality of instructions ate identified by a first encoding of said opcode field, and wherein said second plurality of instructions are identified by remaining encodings of said opcode field wherein each of said first plurality of instructions further includes a second opcode field, and wherein said instruction decompressor is configured to decompress said second opcode field of said received instruction into an opcode field of said corresponding instruction upon detection of said first encoding, and wherein said instruction decompressor is configured to decompress said opcode field of said received instruction into said opcode field of said corresponding instruction upon detection of one of said remaining encodings; and a processor core coupled to receive said corresponding instructions, wherein said processor core is configured to execute said corresponding instructions.

2. The microprocessor as recited in claim 1 further comprising an instruction cache coupled between said instruction decompressor and said processor core, wherein said instruction cache is configured to store said corresponding instructions.

3. The microprocessor as recited in claim 1 further comprising an instruction cache coupled to said instruction decompressor, wherein said instruction cache is configured to store said received instructions.

4. The microprocessor as recited in claim 1 wherein said first fixed length is greater than said second fixed length.

5. The microprocessor as recited in claim 4 wherein said first fixed length is greater than said second fixed length by an integer factor.

6. The microprocessor as recited in claim 5 wherein said integer factor is two.

7. The microprocessor as recited in claim 5 wherein said processor core is configured to fetch instructions according to said second fixed length.

8. The microprocessor as recited in claim 7 wherein said instruction decompressor is configured to detect a fetch of one of said first plurality of instructions by examining a first portion of said one of said first plurality of instructions.

9. The microprocessor as recited in claim 8 wherein said instruction decompressor is configured to convey a NOP upon detection of said one of said first plurality of instructions and to await a second portion of said one of said first plurality of instructions via said processor core fetching, thereby receiving said one of said first plurality of instructions in portions.

10. The microprocessor as recited in claim 1 wherein said processor core is further configured to execute non-compressed instructions from said fixed length instruction set.

11. The microprocessor as recited in claim 10 wherein said non-compressed instructions bypass said instruction decompressor.

12. A method for executing programs created by a programmer in a variable-length instruction set, comprising:

fetching instructions which are members of the variable-length instruction set, wherein said variable length instruction set consists of a first plurality of instructions having a first fixed length and a second plurality of instructions having a second fixed length different from said first length, wherein each of said first plurality of instructions and said second plurality of instructions comprise an opcode field and one or more operands fields, and wherein said first plurality of instructions are identified by a first encoding of said opcode field, and wherein said second plurality of instructions are identified by remaining encodings of said opcode field, and wherein each of said first plurality of instructions further includes a second opcode field;

decompressing said instructions in an instruction decompressor, thereby forming corresponding corresponding instructions from a fixed length instruction set, wherein said decompressing comprises: (i) decompressing said second opcode field of said received instruction into an opcode field of said corresponding instruction upon detection of said first encoding, and (ii) decompressing said opcode field of said received instruction into said opcode field of said corresponding instruction upon detection of one of said remaining encodings; and executing said correspond instructions in a processor core.

13. The method as recited in claim 12 wherein each compressed instruction from the variable length instruction set corresponds to one decompressed instruction from the fixed length instruction set.

14. The method as recited in claim 12 wherein said first fixed length is greater than said second fixed length.

15. The method as recited in claim 12 further comprising fetching non-compressed instructions.

16. The method as recited in claim 15 further comprising executing said non-compressed instructions.

17. The method as recited in claim 16 further comprising bypassing said instruction decompressor when fetching said non-compressed instructions.

18. An apparatus for executing programs created by a programmer in a variable-length instruction set, comprising:

a fetching means for fetching instructions which are members of the variable-length compressed instruction set, wherein said variable length compressed instruction set consists of a first plurality of instructions having a first fixed length and a second plurality of instructions having a second fixed length different from said first length, wherein each of said first plurality of instructions and said second plurality of instructions comprise an opcode field and one or more operand fields, and wherein said first plurality of instructions are identified by a first encoding of said opcode field, and wherein said second plurality of instructions are identified by remaining encodings of said opcode field, and wherein each of said first plurality of instructions further includes a second opcode field;

a decompressing means for decompressing said instructions, thereby forming corresponding instructions, wherein said decompressing means is configured to decompress said second opcode field of said received instruction into an opcode field of said corresponding instruction upon detection of said first encoding, and wherein said decompressing means is configured to decompress said opcode field of said received instruction into said opcode field of said corresponding instruction upon detection of one of said remaining encodings; and an executing means for executing said corresponding instructions.

* * * * *

UNITED STATES PATENT AND TRADEMARK OFFICE
CERTIFICATE OF CORRECTION

PATENT NO. : 5,905,893

DATED : May 18, 1999

INVENTOR(S) : Frank Worrell

It is certified that error appears in the above-indentified patent and that said Letters Patent is hereby corrected as shown below:

Claim 1, col. 24, line 44, please insert --, and-- after "field".

Claim 12, col. 26, line 4, please change "correspond" to "corresponding".

Signed and Sealed this

Twenty-third Day of November, 1999

Attest:

Q. TODD DICKINSON

Attesting Officer

Acting Commissioner of Patents and Trademarks